(12) United States Patent
Zhevzhyk et al.

(10) Patent No.: US 12,269,425 B1
(45) Date of Patent: Apr. 8, 2025

(54) LOCATION-BASED AUTO-IMMOBILIZATION

(71) Applicant: Samsara Inc., San Francisco, CA (US)

(72) Inventors: Oleksandr Zhevzhyk, London (GB); James Michael Rowson, Tarrytown, NY (US); Nicholas Lee Grauman, Maple Grove, MN (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 18/744,256

(22) Filed: Jun. 14, 2024

(51) Int. Cl.
   *B60R 25/33* (2013.01)
   *B60R 25/04* (2013.01)
   *H04W 4/029* (2018.01)

(52) U.S. Cl.
   CPC ............ *B60R 25/33* (2013.01); *B60R 25/04* (2013.01); *H04W 4/029* (2018.02)

(58) Field of Classification Search
   CPC ....... B60R 25/331; B60R 25/04; H04W 4/029
   See application file for complete search history.

(56) References Cited

U.S. PATENT DOCUMENTS

| | | | | |
|---|---|---|---|---|
| 2005/0116816 A1* | 6/2005 | Nitou | ................. | B60R 25/1004 340/932.2 |
| 2007/0200688 A1* | 8/2007 | Tang | ...................... | B60R 25/04 455/1 |

FOREIGN PATENT DOCUMENTS

GB        2335002 A  *  9/1999  ........... B60R 25/102

OTHER PUBLICATIONS

"Mexican Application Serial No. mx a 2024 007823, Office Action mailed Jul. 3, 2024"
"Mexican Application Serial No. mx a 2024 007823, Response filed Aug. 30, 2024 to Office Action mailed Jul. 3, 2024", With English Machine Translation, 108 pgs.

* cited by examiner

*Primary Examiner* — Daryl C Pope
(74) *Attorney, Agent, or Firm* — Schwegman Lundberg & Woessner, P.A.

(57) ABSTRACT

Techniques are presented for enabling vehicle immobilization based on location. One method includes providing a user interface to configure immobilization settings. The vehicle is configured for threat detection, and a data structure is created to define locations where immobilization is enabled. A Behavioral Monitoring System (BMS) prepares and sends a hierarchical map structure to the vehicle's communication device, which determines when to immobilize the vehicle based on its location. The communication device and engine immobilizer are installed in the vehicle. Continuous monitoring for tampering and jamming is performed, and upon detection, the method checks if geographic locking is enabled. If geographic locking is enabled, the vehicle is immobilized according to configuration rules, and the BMS is notified. The immobilization process can be ended based on predefined configuration parameters, such as a time interval, recovery of GPS signal, or driver notification.

20 Claims, 20 Drawing Sheets

COMPLETE MAP LAYER DETAIL

LOCATION-BASED AUTO-IMMOBILIZATION

TECHNICAL FIELD

The subject matter disclosed herein generally relates to methods, systems, and machine-readable storage media for vehicle safety technologies, including methods, systems, and machine-readable storage media for vehicle security.

BACKGROUND

The methods employed by individuals with nefarious intent to gain unauthorized entry into vehicles are manifold and continually evolving. The problem is how to reduce incidents involving the unlawful appropriation of vehicles and the subsequent loss of assets. From the standpoint of a manager in charge of a fleet of vehicles, protecting the vehicles represents a significant concern, as the frequency of vehicle theft has shown a marked increase. These methods range from the use of physical force to compromise vehicle locks to the exploitation of technological vulnerabilities within the vehicle's electronic systems.

One way to protect a vehicle is by immobilizing the vehicle. However, some countries do not allow vehicle immobilization or allow it under limited circumstances. Further, there may be safety considerations, such as a vehicle traveling at high speed, so appropriate measures have to be taken to immobilize the vehicle safely.

What are needed are methods to detect threats to the possession of the vehicle and the implementation of measures to protect the vehicles while assuring that the conditions are appropriate for immobilization, such as making sure that the vehicle is in a geographical area where immobilization is enabled.

BRIEF DESCRIPTION OF THE DRAWINGS

Various appended drawings illustrate examples of the present disclosure and cannot be considered limiting its scope.

DETAILED DESCRIPTION

Figure 1A:
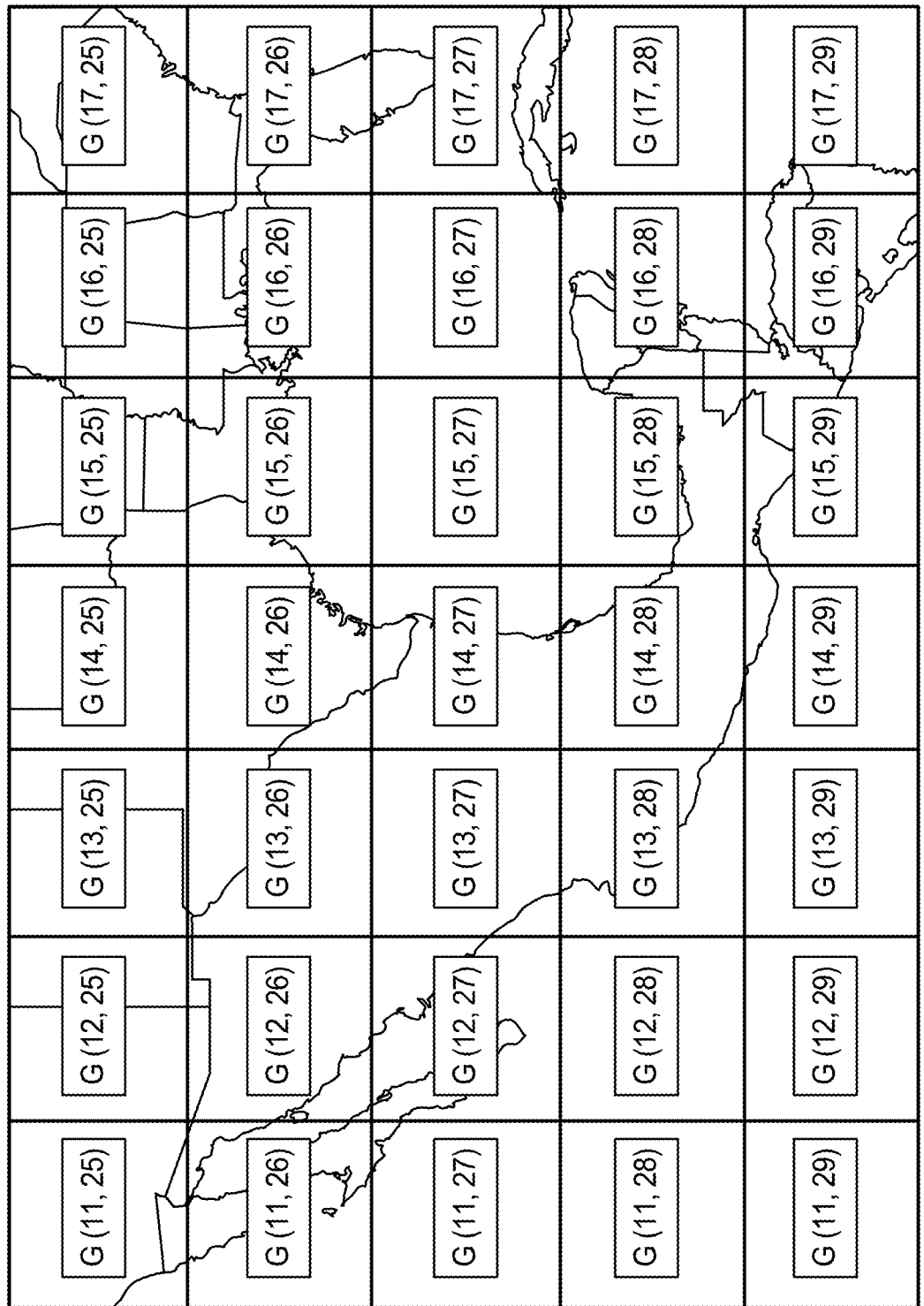
FIGS. 1A-1C illustrate the tile structure of a zoomable map, according to some examples.

Example methods, systems, and computer programs are directed at enabling vehicle immobilization based on location. Examples merely typify possible variations. Unless explicitly stated otherwise, components and functions are optional and may be combined or subdivided, and operations may vary in sequence or be combined or subdivided. The following description provides numerous specific details to provide a thorough understanding of examples. However, it will be evident to one skilled in the art that the present subject matter may be practiced without these specific details.

Techniques are presented to enable a computing device to determine if the vehicle is in a geographical area where immobilization is enabled, such as the vehicle is within the boundaries of a country (e.g., Mexico, Brazil). Some of the methods presented are discussed with reference to the country of Mexico, but the same principles may be used for other countries, a group of countries (e.g., Europe), or geographical areas within a country.

In some examples, a comm device includes firmware to determine whether the vehicle is in a particular country using the onboard GPS before making auto immobilization decisions. The data used to make the decision is contained solely on the comm device, so immobilization will take place even if the comm device has no connectivity to other devices, such as a server.

In some examples, if the comm device does not have a good GPS signal GPS (e.g., within a canyon, in the presence of a jamming device), the comm device will use the Mobile Country Code (MCC) reported by a cellular connection to determine the country where the vehicle is and make the decision whether to immobilize the vehicle based on the MCC.

The present techniques relate to a security system that detects tampering and jamming events in a vehicle. According to certain examples, tampering may refer to unauthorized manipulation or interference with the vehicle's hardware or software systems, such as the removal of the dashboard cover to access internal components or unauthorized attempts to disable the vehicle's tracking device. An example of tampering includes a scenario where an intruder attempts to disconnect the vehicle's communication device to prevent it from sending location data. On the other hand, jamming may include deliberate interference with the communication and signal reception capabilities of the vehicle, typically through the use of devices that emit signals to block or disrupt the vehicle's GPS or cellular connections. An example of jamming is the use of a GPS jammer to prevent the vehicle from accurately reporting its location, potentially facilitating theft or unauthorized use. The disclosed security system considers various scenarios involving customizable logic for activating safety mechanisms in the vehicle. For instance, in one scenario, the vehicle's speed is a safety concern, and immobilization should not occur unless the vehicle's speed is zero or very low.

Upon detecting jamming, the system will immobilize the accelerator of the vehicle after a wait period. If tampering is detected, the vehicle may be immobilized immediately. This wait time reduces false positives due to signal interference that may be misinterpreted as jamming.

Auto-mobilization may be inadequate in certain situations, such as when the vehicle stops at a toll booth or checkpoint, what is referred to herein as a friendly jamming zone. To address this, immobilization is disabled until the vehicle is out of the friendly jamming zone. This feature is helpful in scenarios where immobilization could lead to unintended consequences or disruptions, such as blocking traffic at a toll booth or causing delays at security checkpoints.

Figure 1B:
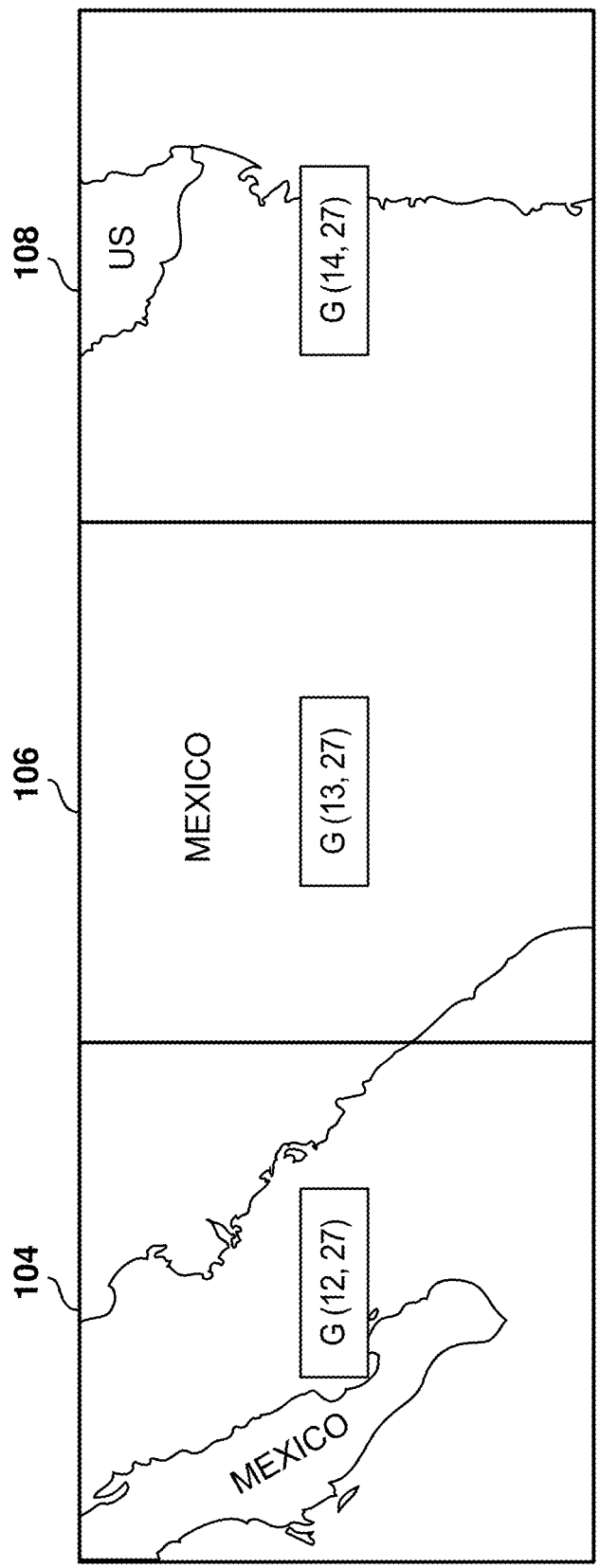
Figure 1C:
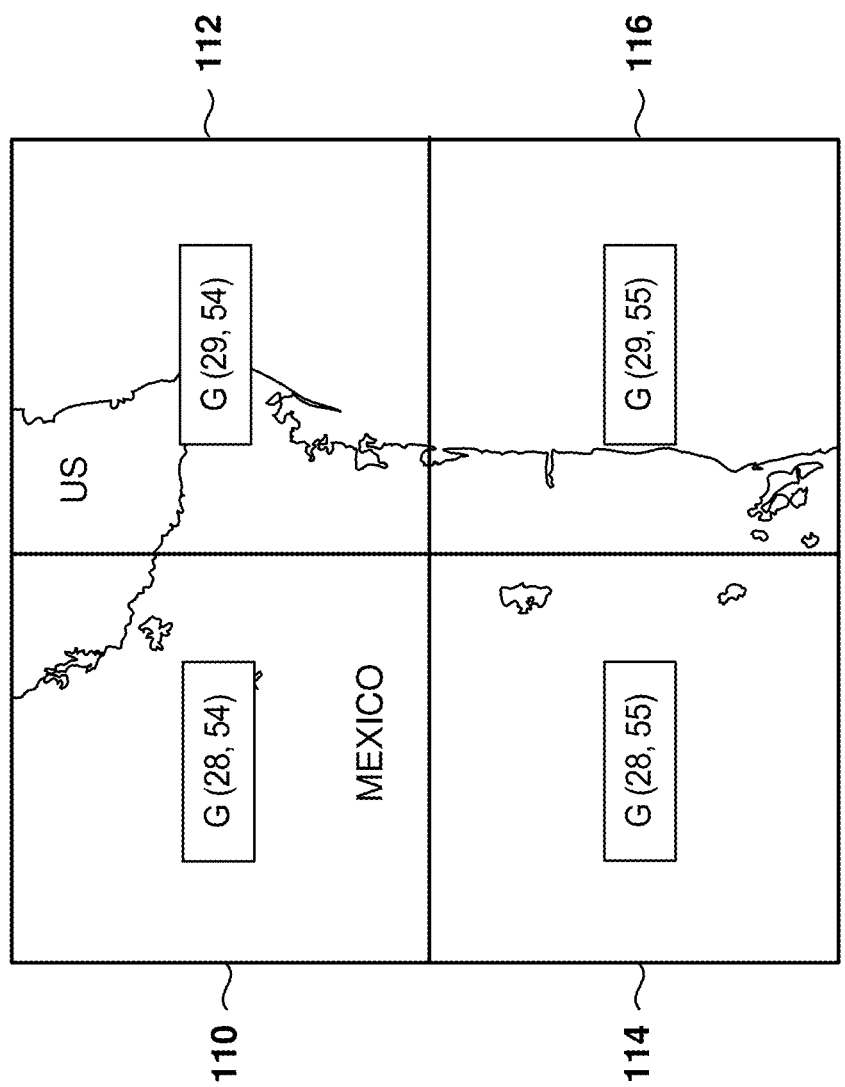

FIGS. 1A-1C illustrate the tile structure of a zoomable map, according to some examples. One problem being addressed involves determining the geographical location of a vehicle situated within a country without access to cellular connectivity. The objective is to ascertain whether the comm device in the vehicle is located within the country to enable or disable engine immobilization based on legal restrictions. The challenge lies in executing this determination without backend connectivity and considering the device's limitations in terms of memory and processing power. The techniques presented efficiently and accurately identify the vehicle's location within the country while minimizing the computational load on the device.

A data structure was created to determine if the vehicle's position is within the geographical area. Two components are part of the solution: a quadtree and Slippy tiles.

The quadtree is commonly employed in graphics to efficiently partition the area of interest into smaller segments for swift navigation. In one implementation, the quadtree functioned adequately with quick wake-up times; however, it was found to consume a large amount of memory. A modified quad-tree is presented to overcome this problem by storing less data in each node of the tree.

The quadtree is used for partitioning a two-dimensional space by recursively subdividing it into four quadrants or regions. The quadtree has the following three properties:

1. Nodes and children: Each node in a quadtree has zero or four children. If a node has children, it is subdivided into four equal quadrants. In some examples, a modified version of the quadtree is used, where a node may have from zero to four children, e.g., if a child node would only cover an area where immobilization is not enabled, then this node is not created. This means that when traversing the tree, if the location of the vehicle is not within a node of the tree, then this would mean that immobilization is not allowed.

2. Recursive subdivision: The space is recursively divided into zero to four quadrants until a specific condition is met, such as a maximum depth or a minimum tile size has been reached.

3. Representation of space: The root node represents the entire space, and each subsequent level of nodes represents progressively smaller subdivisions of the space.

Slippy tiles are a method used to manipulate maps in a way that allows for smooth panning and zooming. Slippy Tiles have the following three characteristics:

1. Tile-based system: the map is divided into a grid of square tiles (typically 256×256 pixels in size), and each tile represents a part of the map at a specific zoom level. In some examples, Slippy tiles for areas where immobilization is not enabled are not created.

2. Zoom levels: the map can be viewed at various zoom levels, with each zoom level providing a different level of detail. At higher zoom levels, the map is divided into more tiles, allowing for more detailed views. At zoom level 0, the whole world is a single tile with coordinates (0, 0). At zoom level 1, the world is covered by four tiles; at zoom level 2, it is covered by 16 tiles, and so forth. At zoom level 15, the area covered by a tile is about 1 square kilometer, which is enough resolution for most applications. However, other applications may use the smallest tiles at a different zoom level.

3. Tile naming and retrieval: tiles are usually named based on a coordinate system (x, y) and a zoom level (z). This allows for easy retrieval of specific tiles.

The entire map is treated as a grid. At zoom level 0, the entire map fits into a single tile. At zoom level 1, the map is divided into four tiles (2×2 grid), and so on, with each subsequent zoom level doubling the number of tiles along each axis. FIG. 1A shows a section 102 of a tiled map at zoom level 6, and FIG. 1C shows details of a tile at zoom level 7.

Each tile is identified by its x and y coordinates within the grid at a particular zoom level. For example, a tile at zoom level 3 with coordinates (2, 1) can be uniquely identified and loaded. Using the zoom level and the x and y coordinates of a tile, the geographic coordinates of the tile can be calculated.

In some examples, Google coordinates are used, but other implementations may use other coordinates, such as Tile Map Service (TMS) tiles. Google Maps utilizes a Spherical Mercator projection, and the entire world looks like a square, making it easy to work with on a computer.

The Google coordinates, also referred to herein simply as coordinates unless otherwise specified, include the x and y parameters as well as the zoom level. In FIG. 1A, the top left tile has coordinates (11, 25), and the y coordinate increases as for the tiles below, such as (11, 26), (11, 26), etc. Further, the nodes to the right have increasing x coordinates, such as (12, 25), (13, 25), etc.

FIG. 1B shows details of three tiles, also at zoom level 6. Tiles 104 and 106 cover parts of Mexico and ocean areas. Since land vehicles do not travel through water, a simplification is made to assign these tiles 104 and 106 as being part of Mexico. This way, there is no need to include further details for these tiles, such as having to create children tiles at zoom level 7.

Further, if a node covers water and the area where immobilization is not allowed (e.g., the US and the ocean), then the node is considered to be completely in the disabled area, and the node is not created. This way, when the node for the location is not found, the system will determine that immobilization is not allowed because the location is not in the geographical area where immobilization is enabled.

Tile 108 covers part of Mexico, part of The United States, and water areas. To enable immobilization in Mexico and not in the United States, tile 108 is divided into four tiles at zoom level VII, as illustrated in FIG. 1C.

In FIG. 1C, tile 114 only covers Mexico, so this tile will not have children tiles. Tile 110 includes parts in Mexico and parts in the United States, so tile 110 will have children tiles. Tile 112 covers Mexico, the United States, and water, so it will have children tiles because of covering a country outside of Mexico. Tile 116 covers land in Mexico and water areas, so tile 116 will not have child tiles because the water areas are included as part of Mexico for purposes of determining if a land vehicle is in Mexico.

In order to describe Mexican territory, the comm device has to determine which tiles cover Mexico at the desired zoom level, such as zoom level 15, which is used for illustration purposes. The Mexican territory is about 1,943,950 square kilometers, so using tiles of 1 km², about 1,943,950 tiles will have to be stored, where each tile includes x, y, and zoom level, which would require about 12 bytes per tile, and a total of about 25 Mb.

For an application that is installed in firmware, this amount of storage is not easy to use in a small computing device. Further, lookups to determine if a location is within Mexico would be slow for most case uses. The challenge lies in constructing a different data structure that is efficient for use in firmware.

One technique involves storing data within the tree structure as pointers to nodes, and the goal is to compute everything without the need for additional data storage within the nodes. As used herein, a node is an element in a tree-shaped data structure, and each node is associated with one map tile.

One benefit of the quadtree is that the tree structure enforces values of x, y, and zoom for each tile. Based on the x, y, and zoom of the root level, then it is possible to calculate the x, y, and zoom for the descendant nodes during traversal.

Given a tile with values $x_p$, $y_p$, and $zoom_p$, the parameters for the four children nodes would be:
Node 1 (top left): $2 \times x_p$, $2 \times y_p$, and $zoom_p+1$;
Node 2 (bottom left): $2 \times x_p$, $2 \times y_p+1$, and $zoom_p+1$;
Node 3 (top right): $2 \times x_p+1$, $2 \times y_p$, and $zoom_p+1$;
Node 4 (bottom): $2 \times x_p+1$, $2 \times y_p+1$, and $zoom_p+1$;

In some examples, the root node is the only node that stores the coordinates x and y, as well as the zoom level. The root node and the rest of the nodes include four pointers to the child nodes, and each pointer may have a pointer that identifies a child node or a NULL value to indicate that the child node does not exist.

In some examples, the calculation of the x, y, and zoom for child nodes is as follows:
topLeftTile:={
  Zoom: parentTile.Zoom+1
  X: parentTile.X*2//2
  Y: parentTile.Y*2//6
}
bottomLeftTile:={
  Zoom: parentTile.Zoom+1
  X: parentTile.X*2//2
  Y: parentTile.Y*2+1//7
}
topRightTile:={
  Zoom: parentTile.Zoom+1
  X: parentTile.X*2+1//3
  Y: parentTile.Y*2//6
}
bottomRightTile:={
  Zoom: parentTile.Zoom+1
  X: parentTile.X*2+1//3
  Y: parentTile.Y*2+1//7
}

In one example, the root node is defined as follows:
Root:={
  X=0
  Y=0
  Zoom=1
  Node1pointer
  Node1pointer
  Node3pointer
  Node4pointer
}

That is, the root node includes the x and y coordinates, the zoom level, and the four pointers for child nodes. The rest of the nodes include the four pointers (but do not include the x, y, and zoom values) as follows:
Node:={
  Node1pointer
  Node1pointer
  Node3pointer
  Node4pointer
}

The geographic coordinates of each tile can be easily computed based on the x, y, and zoom values of the tile to determine if the location of the vehicle is within the tile or not.

In some examples, if a particular node (referred to as a "partial" node) has some children nodes that are in Mexico and some that are not, those children nodes that are outside of Mexico are dropped from the tree (e.g., by using a nil pointer to the location of the child). That is, the map data structure may include leaf nodes (nodes without children) at more than one zoom level, or in other words, the tree is not a complete tree with all the leaf nodes at the same level. Additionally, if a node covers land outside Mexico and water areas, then the node will also be dropped from the tree.

This data structure provides a couple of benefits:

1. Fast lookup (O(log N) complexity lookup in the order of log (N) where N is the number of nodes). In the worst case, the x, y, zoom, and tile coordinates have to be calculated 60 times (15 levels of descendants times four children nodes in each node). In practice, the lookup will be much faster, on average.

Figure 2:
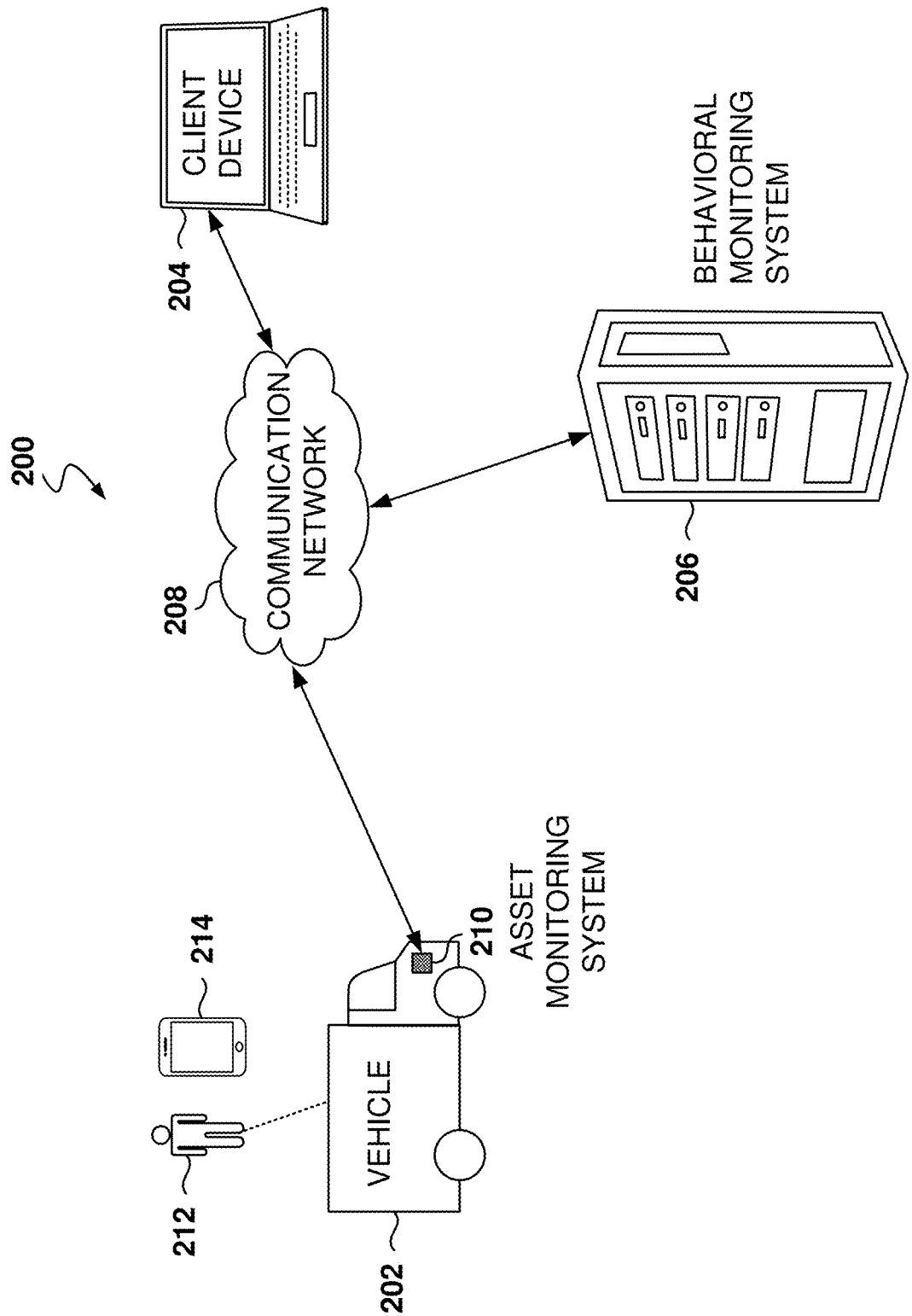
FIG. 2 shows a system for vehicle rider behavioral monitoring, according to some examples.

FIG. 2 shows a system 200 for vehicle rider behavioral monitoring, according to some examples. As shown, multiple devices (e.g., vehicle 202, client device 204, and behavioral monitoring system 206) are connected to a communication network 208 and configured to communicate with each other through the communication network 208. The communication network 208 is any type of network, including a local area network (LAN), such as an intranet, a wide area network (WAN), such as the internet, a mobile telephone network, a satellite communications network, or any combination thereof. The communication network 208 is implemented using any number of communication links associated with one or more service providers, including one or more wired communication links, one or more wireless communication links, or any combination thereof.

The vehicle 202 may be any type of vehicle or combination vehicle, such as an automobile, semi-trailer truck, trailer, plane, train, ship, and the like. Further, the techniques presented herein may be used with other non-moving assets that are operated by an operator (e.g., cranes, manufacturing equipment, call centers) and assets that are controlled remotely (e.g., drones, air traffic controllers). The examples described herein should therefore not be interpreted to be exclusive or limiting, but rather illustrative.

As shown, the vehicle 202 includes an asset monitoring system (AMS) 210 that allows for monitoring events at the vehicle and exchanging information and commands between the vehicle 202 and one or more remote computing devices via the communication network 208.

The asset monitoring system 210 may include one or more hardware devices to perform monitoring functions at the vehicle, such as a communications device and a camera device, but other configurations are also possible.

The asset monitoring system 210 allows the vehicle 202 to transmit data, such as sensor data gathered by sensors in the vehicle 202, to a remote computing device. The vehicle 202 may be equipped with a variety of sensors that capture data describing the performance of the vehicle 202, actions performed by riders in and around the vehicle 202, and the vehicle's surrounding environment.

The behavioral monitoring system 206 is a computing system consisting of one or more computing devices configured to provide remote behavioral monitoring of a vehicle 202 to detect different conditions of driver state and execute corresponding responses. For example, the behavioral monitoring system 206 may allow a user, such as a fleet manager administrator, to define a set of triggering conditions and criteria for detecting and responding to undesirable behavior or dangerous conditions.

To utilize the functionality of the behavioral monitoring system 206, users (e.g., administrators and fleet managers) may use the client device 204. Although the shown system 200 includes only one client device 204 and one vehicle 202, this is only for ease of explanation and is not meant to be limiting. One skilled in the art would appreciate that the system 200 could include any number of client devices 204 and vehicles 202. Further, the behavioral monitoring system 206 may concurrently accept communications from and initiate communication messages and interact with any number of client devices 204 and vehicles 202, and support connections from a variety of different types of client devices 204.

A user may interact with the behavioral monitoring system 206 via a client-side application installed on the client device 204. In some examples, the client-side application includes a component specific to the behavioral monitoring system 206. For example, the component may be a stand-alone application, one or more application plug-ins, or a browser extension. However, the users may also interact with the behavioral monitoring system 206 via a third-party application, such as a web browser or messaging application, that resides on the client device 204 and is configured to communicate with the behavioral monitoring system 206. In either case, the client-side application presents a user interface (UI) for the user to interact with the behavioral monitoring system 206.

The behavioral monitoring system 206 may provide a user interface that allows administrators to configure the triggering conditions. Each triggering condition defines one or more individual conditions that, if satisfied, indicates the occurrence of an undesirable behavior or a critical event such as a collision. For example, a triggering condition may define one or more terms or a string of terms that, if spoken, indicate the use of offensive, derogatory, and otherwise undesirable language. As another example, a triggering condition may define unsafe lane-departure events.

The user interface also enables the administrators to define corresponding actions to be performed in the event that a triggering condition has been satisfied/triggered. For example, the user interface enables the administrator to define contact identifiers (e.g., email addresses, phone numbers, etc.) to which notifications are to be sent. Similarly, the user interface enables the administrator to define actions for generating an incident report based on the detected occurrence of undesirable behavior.

Further, a driver 212 may interact with the behavioral monitoring system 206 and the AMS 210 via a mobile device 214. A BMS app may execute on the mobile device 214 and connect (e.g., via wireless communication such as cellular, WiFi, or Bluetooth) to the AMS 210 and the behavioral monitoring system 206 to perform operations related to the BMS, such as getting information for a trip, receiving feedback regarding in-vehicle behavior, attend training, etc. Alternatively, the driver 212 may access the same functionality via a web browser executing on the mobile device 214.

Figure 3:
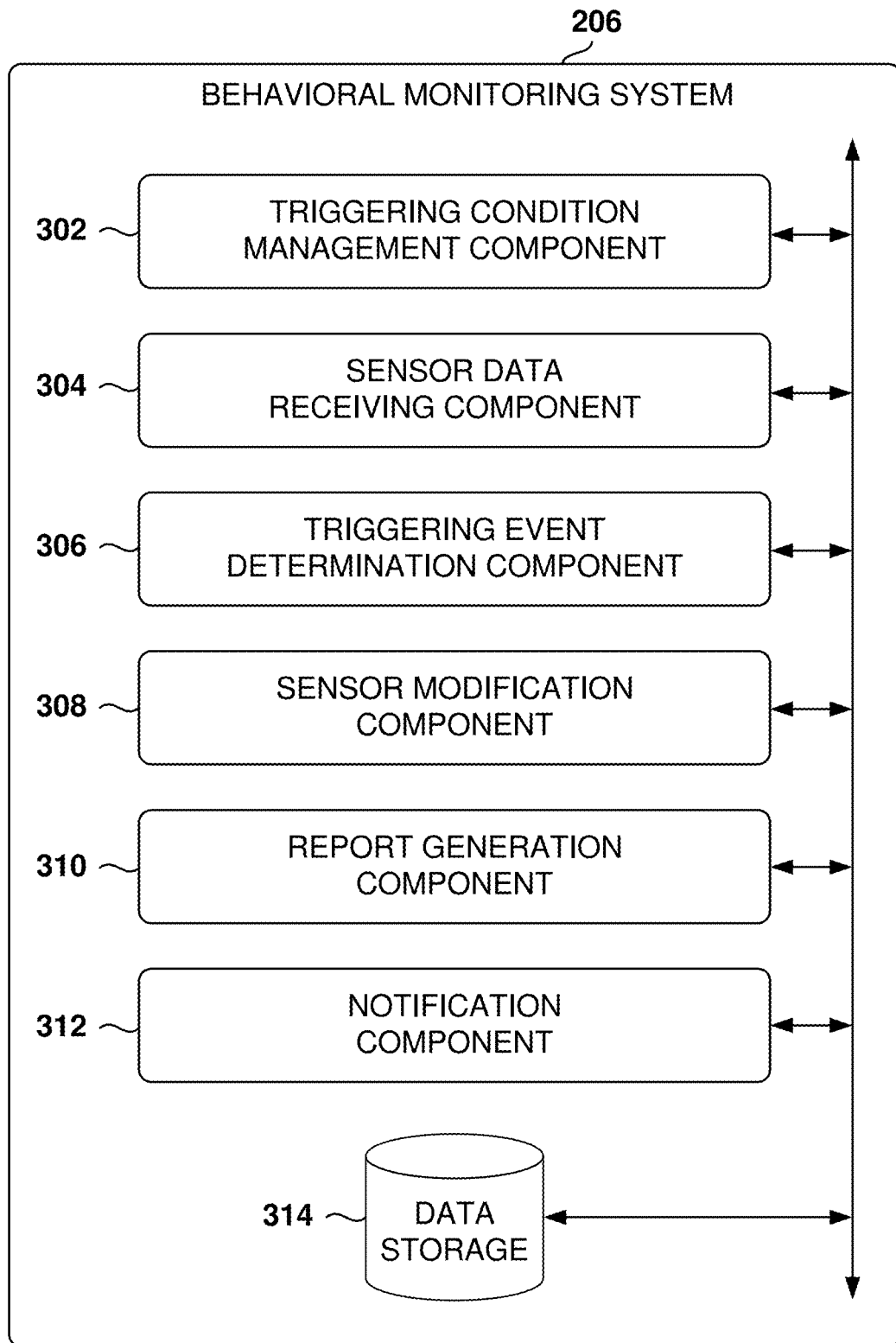
FIG. 3 is a block diagram of a Behavioral Monitoring System (BMS), according to some examples.

FIG. 3 is a block diagram of a behavioral monitoring system 206 (BMS), according to some examples. To avoid obscuring the inventive subject matter with unnecessary detail, various functional components (e.g., modules) that are not germane to conveying an understanding of the inventive subject matter have been omitted from FIG. 3. The various functional components depicted in FIG. 3 may reside on a single computing device or may be distributed across several computing devices in various arrangements, such as those used in cloud-based architectures.

The behavioral monitoring system 206 includes a triggering condition management component 302, a sensor data receiving component 304, a triggering event determination component 306, a sensor modification component 308, a report-generation component 310, a notification component 312, and a data storage 314.

The triggering condition management component 302 facilitates the generation and modification of triggering conditions. For example, triggering condition management component 302 provides a graphical user interface that allows administrators to generate and modify triggering conditions. Each triggering condition defines one or more individual conditions that, if satisfied, indicates the occurrence of an undesirable behavior, as well as a corresponding set of response actions to be performed if the triggering condition has been satisfied. The user interface provided by the triggering condition management component 302 enables administrators to define the triggering conditions. Triggering conditions may include any one or combination of specific criteria or parameters that, when met or surpassed, prompts a predetermined or user-defined response within the system. For example, such conditions can include: thresholds; the detection of image features from camera feeds; anomalies in sensor data, such as irregular steering or braking patterns; behavioral patterns, including, for example, a lack of interaction with vehicle controls or infrequent checks of mirrors; as well as the presence of certain environmental factors like the time of day, adverse weather conditions, or high traffic density.

Similarly, an administrator may use the user interface elements to define corresponding actions to be performed in the event that a triggering condition has been triggered. In some examples, the triggering condition management component 302 stores the generated triggering conditions in the data storage 314. The stored triggering conditions may be associated with an account and fleet identifier that identifies the account, vehicle fleet, or vehicles to which the triggering conditions are associated.

The sensor data receiving component 304 receives sensor data from the vehicles 202, including data from the sensors in the AMS 210. The sensor data receiving component 304 provides the sensor data to the other components of the behavioral monitoring system 206 for use in detecting the occurrence of undesirable behavior. The sensor data receiving component 304 may also store the sensor data in the data storage 314, where it may be accessed by the other components of the behavioral monitoring system 206. For example, the stored sensor data may be associated with a unique identifier associated with the vehicle 202 from which the sensor data was received. The sensor data may also include timestamp data indicating the time at which the sensor data was captured by the sensors of the vehicle 202 or when the sensor data was received by the behavioral monitoring system 206.

The triggering event determination component 306 uses the sensor data received by the sensor data receiving component 304 to determine whether any of the triggering conditions have been satisfied. In some examples, a triggering condition may be based on a combination of individual conditions, such as a combination of detecting specified terms, detecting specified motions, or detecting a specified volume level. In these types of examples, the triggering event determination component 306 may use the sensor data to determine that each of the individual conditions has been satisfied within a predetermined time window, such as within a five-second window. For example, the triggering event determination component 306 may use timestamp data associated with the sensor data to determine whether each of the individual conditions was satisfied within the predetermined time window. Accordingly, the triggering condition is satisfied when each of the individual conditions occurs within the predetermined time window.

The triggering event determination component 306 notifies the other components of the behavioral monitoring system 206 if a triggering condition has been triggered.

The sensor modification component 308 modifies the operating mode of sensors in the vehicle 202. In some cases, an administrator or fleet manager may wish to capture additional or higher-quality sensor data to document a detected incident of undesirable behavior. For example, the administrator or fleet manager may wish to initiate the use of sensors, such as cameras, microphones, or other sensor devices, to capture sensor data and document the incident.

The report-generation component 310 generates an incident report to document a detected occurrence of undesirable behavior. The incident report may include any of a variety of data defined by an administrator in a triggering condition. For example, an incident report may include data identifying the vehicle 202, the driver of the vehicle, the time of the incident, the action that satisfied the triggering condition (e.g., lane departure, tampering, driving while drowsy, etc.), as well as captured sensor data depicting the incident. The report-generation component 310 may store the incident report in the data storage 314, where an administrator or other authorized user may access it.

The notification component 312 generates and transmits a notification to users defined by the triggering condition. For example, the notification component 312 identifies a contact identifier corresponding to the triggering event. An administrator may define the contact identifier when generating the triggering event. The contact identifier provides contact details for reaching a user designated to receive a notification when the triggering event is triggered. For example, the contact identifier may be an email address, phone number, and the like.

The notification component 312 may then transmit a notification directed to the content identifier. The notification may provide details of the detected incident, such as a description of the undesirable behavior, time, associated vehicle 202, and the like. The notification may also enable a user to access an incident report associated with the detected incident.

Figure 4:
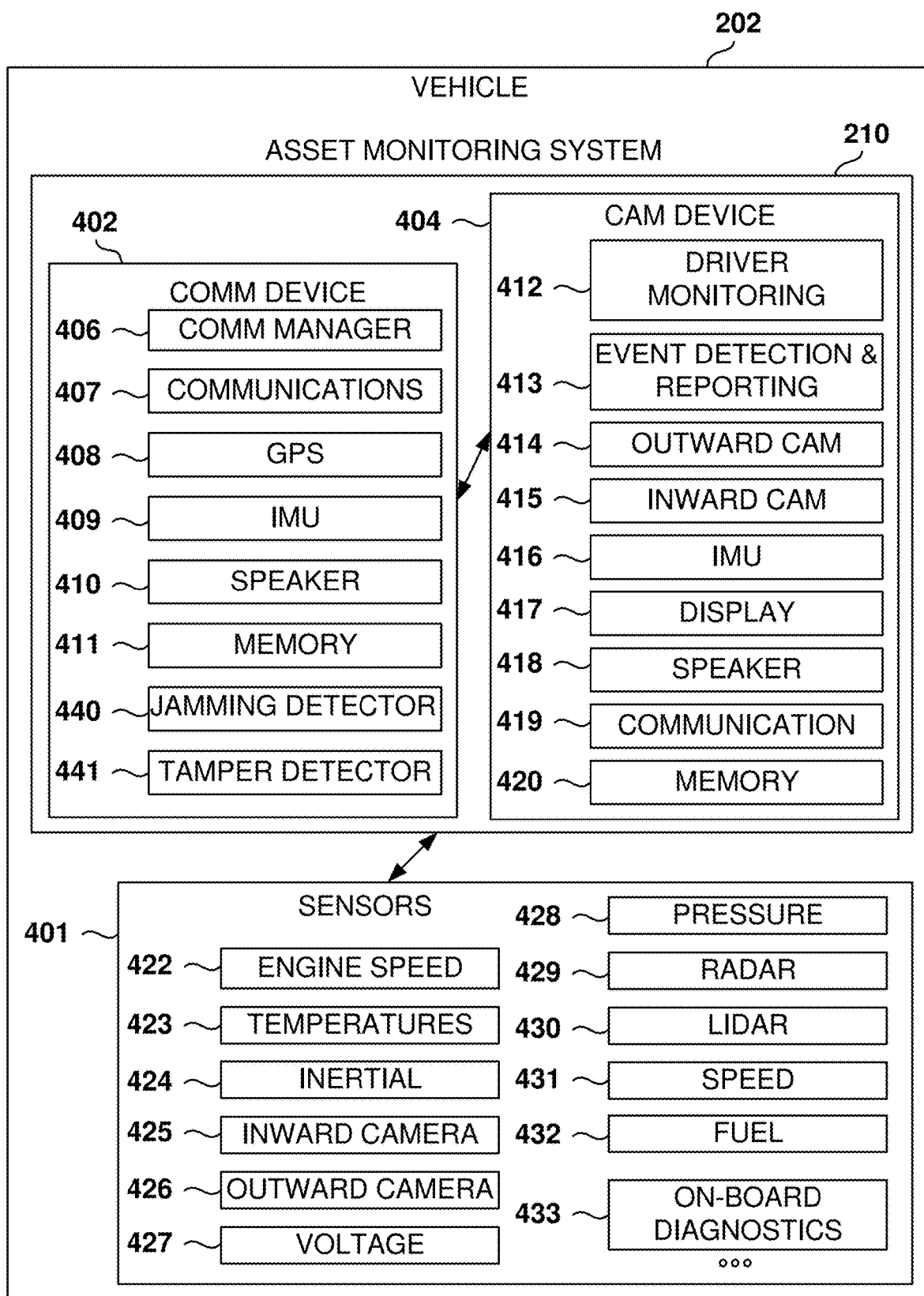
FIG. 4 illustrates the components of a vehicle for rider behavioral monitoring, according to some examples.

FIG. 4 illustrates components of a vehicle 202 for rider behavioral monitoring, according to some examples. The vehicle 202 includes the asset monitoring system 210 and a plurality of sensors 401. The AMS 210 may include a single device or distribute its functions across a plurality of devices in the vehicle (e.g., sensors, processors, communications devices) that are able to communicate among themselves. In the illustrated example, the AMS 210 includes a comm device 402 and a cam device 404, but other examples may utilize different numbers of devices or distribute their functionality differently.

The comm device 402 provides communication services within the vehicle and the network and may connect to the diagnostic port in the vehicle to gather vehicle information. In some examples, the comm device 402 includes a communications manager 406, a communications module 407, a Global Positioning System (GPS) 408, an Inertial Measurement Unit (IMU) 409, a speaker 410, computer memory 411 (RAM and permanent storage), a jamming detector 440, a tamper detector 441, and one or more processors (not shown). The GPS 408 and the IMU 409 may be used, together or separately, to calculate the speed of the vehicle.

The communications manager 406 coordinates communications with the BMS and other devices in the vehicle, such as the cam device 404. The communications module 407 provides one or more communication interfaces, such as mobile telephony, satellite communications, WiFi, Bluetooth, etc. Further, the communications manager 406 may provide a WiFi hotspot to other devices in the vehicle so these devices can communicate to the network via the WiFi hotspot.

The IMU 409 sensor detects the motion and orientation of the vehicle, and the memory 411 stores data collected during the operation of the vehicle and programs that may be executed on the comm device 402.

The jamming detector 440 detects when the electronic signals (e.g., Global Positioning System (GPS)) to the vehicle are being jammed, such as by utilizing a GPS jammer. The GPS jammer is a device that disrupts or interferes with the signals from GPS satellites by emitting radio frequency signals that can overwhelm the GPS signals, making it difficult or impossible for GPS receivers to determine their location accurately. The GPS jammers may use interference to broadcast signals at the same frequency as GPS satellites, which can overpower the weak signals from space. This interference can cause the GPS receiver to lose its lock on the satellite signals, rendering it unable to calculate its position. The GPS jammers may also use jamming signals that are stronger than the GPS signals, which are already very weak when they reach the Earth's surface. The tamper detector 441 is for detecting tampering, such as when the dashboard cover is being removed.

In some examples, the cam device 404 includes a driver monitoring 412 module, an event detection and reporting system 413, an outward camera 414 that captures images in the direction of travel, an inward camera 415 that captures images of the vehicle cabin, an IMU 416, a display 417 (e.g., a touchscreen, computer display, LED lights), a speaker 418, a communications module 419, a memory 420, and a processor (not shown). The inward camera 415 is installed within the vehicle cabin to monitor the driver and passengers, while the outward camera 414 provides visual information about the environment surrounding the vehicle.

The driver monitoring 412 module performs one or more activities regarding driver behavior, such as LD detection, driving while drowsy, following too close, sudden breaking, etc. The event detection and reporting system 413 is configured to identify and log significant events based on sensor data. The display 417 provides visual feedback and information to the vehicle occupants, while the speaker 418 provides auditory information or alerts. Further, the memory 420 stores data collected during the operation of the vehicle and programs that may be executed on the cam device 404.

In some examples, the cam device 404 is configured to execute the machine learning models described, but other examples may execute the machine learning models in the comm device 402. Other configurations may include additional devices within the AMS 210 or consolidate all functions within a single device.

In some examples, the comm device 402 and the cam device 404 are connected via a hardwire connection (e.g., USB), and the cam device 404 may be powered via this hardwire connection. In some examples, the comm device 402 draws power from the vehicle's electrical system. Further, the AMS may include other sensors, such as any of the sensors 401. The AMS 210 is configured to communicate with any of the sensors 401 in the vehicle.

The sensors 401 are configured to monitor various parameters and states of the vehicle. In some examples, the sensors 401 include an engine speed sensor 422 that measures the revolutions per minute of the engine, temperature sensors 423 that measure various temperature points in the vehicle (e.g., cabin, engine, outside), and inertial sensors 424 that detect motion and orientation of the vehicle. The sensors 401 may also include an inward camera 425, an outward camera 426, a voltage sensor 427 that monitors the electrical system of the vehicle, and pressure sensors 428, which detect the pressure in various systems such as tires or hydraulic systems. Further, the sensors 401 may include radar sensors 429 and Light Detection and Ranging (LIDAR) sensors 430, which provide distance and mapping capabilities for the vehicle's surroundings. A speed sensor 431 measures the traveling speed of the vehicle, and fuel sensors 432 monitor the amount of fuel in the tank. The vehicle may also include an on-board diagnostics system 433 for self-diagnosis and reporting of the operational status of the vehicle 202.

Figure 5:
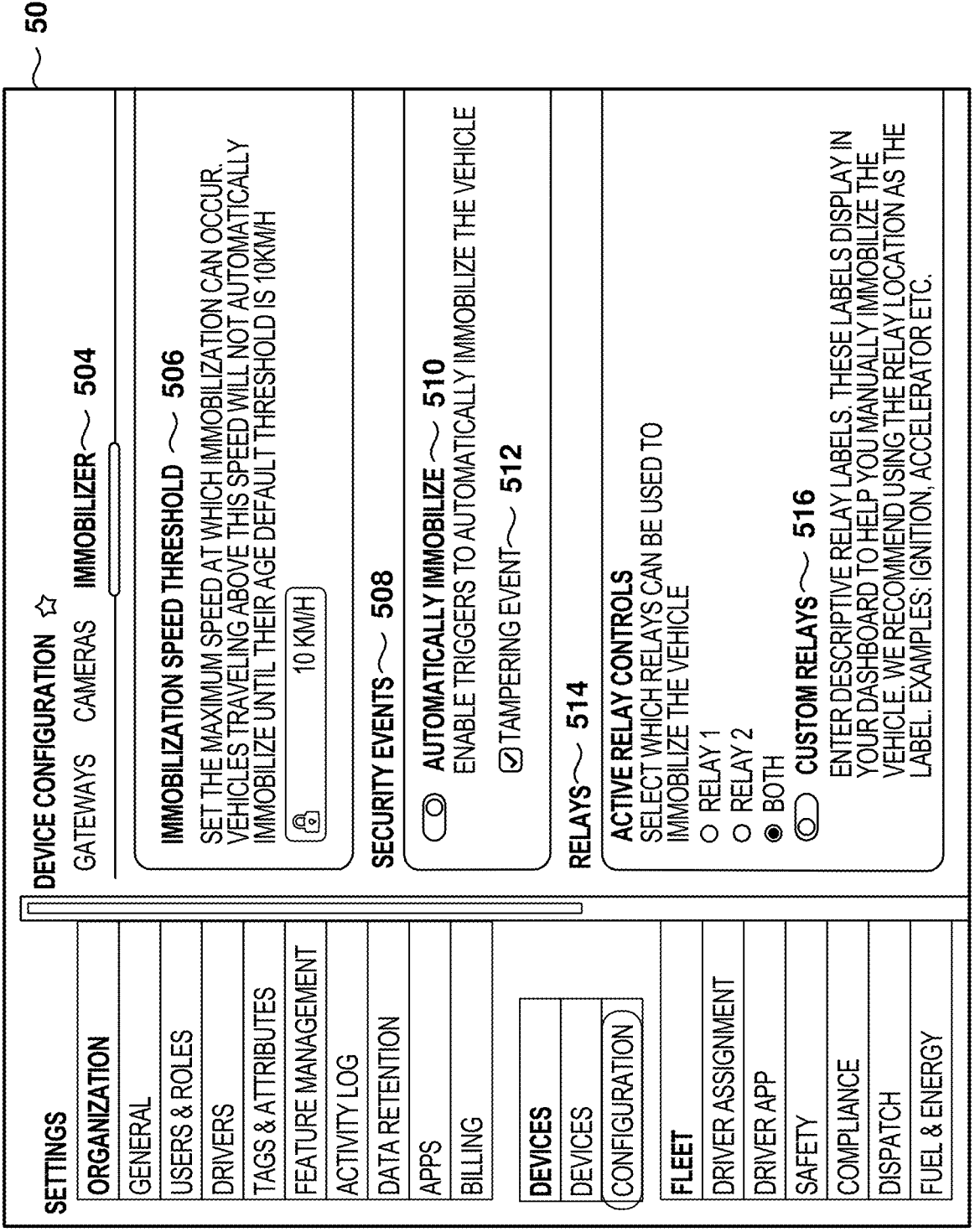
FIG. 5 is a user interface (UI) for configuring engine immobilization, according to some examples.

FIG. 5 shows UI 502 for configuring engine immobilization, according to some examples. The UI includes various elements that allow a user to customize settings related to a vehicle's immobilization.

At the top of the UI 502, there is a settings header on the left that indicates the current section of the UI, which is "Device Configuration." On the right side of the UI 502, the device configuration parameters are presented, including options for gateways, cameras, and immobilizer 504, which is the selection option.

Section 506 is for the immobilization speed threshold, which includes a field for configuring the maximum speed at which immobilization can occur. This option may be blocked (as in the shown example) when the maximum speed is not configurable or when the vehicle operates in a geography where the immobilization is disabled while the vehicle is moving. The UI 502 provides a note explaining that vehicles traveling above this speed will not automatically immobilize until their speed drops below the threshold.

Section 508 is for security events and includes a toggle switch 510 labeled automatically immobilize, which, when activated, enables triggers to immobilize the vehicle automatically. Below the toggle switch 510, an option 512 is presented for enabling or disabling immobilization contemporary is detected.

Further down, section 514 is for configuring the relay parameters. The section 514 options for activating the relay controls, which allow the user to select which relays can be used to immobilize the vehicle. Options include "Relay 1," "Relay 2," or "Both."

Further, the field 516 is for custom relays, where the user can enter descriptive relay labels. These labels are intended to be displayed in the user's dashboard to assist in manually immobilizing the vehicle. The UI suggests using the relay location as the label and provides examples such as "ignition" and "accelerator."

The UI is designed to provide a user-friendly experience for configuring engine immobilization settings, with clear labels, information fields, and options that allow for easy customization according to the user's preferences and requirements.

The UI 502 may include additional options for the configuration of immobilization parameters. In some examples, an option is provided to allow the administrator to specify how long the vehicle will be immobilized. The user may change the system default (e.g., 45 minutes) to a different value.

In some examples, an additional checkbox is presented to enable immobilization for jamming events, with the associated jamming configurable parameters, such as the period of jamming required before the vehicle is immobilized.

In some examples, an option is provided to control the duration of the jamming detection before triggering immobilization. The user may use the system default (e.g., 10 minutes) or configure a custom value.

It is noted that the administrator may configure the immobilization parameters for the whole fleet or for each individual vehicle in the fleet. For example, the administrator may select to enable immobilization in some vehicles and not in others. For example, some companies may need immobilization due to contractual and insurance agreements; some may only need specific routes to have this functionality, and that is why the BMS enables granular control of which vehicles enable auto-immobilization.

In some examples, another option is provided to allow the driver control over the immobilization feature via the driver app or a panic button. If the driver is enabled to trigger immobilization, the driver will be able to immobilize the vehicle under duress.

Further, the BMS UI includes a safety inbox where users receive notifications of events associated with the monitoring of the BMS. In some examples, the jamming and tampering events are sent to the safety inbox of one or more administrators. In some examples, if the cam device is installed in the vehicle, a video of the event is also included in the notifications. For example, the video may cover the view of the cabin and the view of the road ten minutes before and after the security event was detected.

Further, the BMS UI provides an option to remobilize a vehicle that has been immobilized. Selecting this option will cause the BMS to send a command to the com device to end the immobilization.

Figure 6:
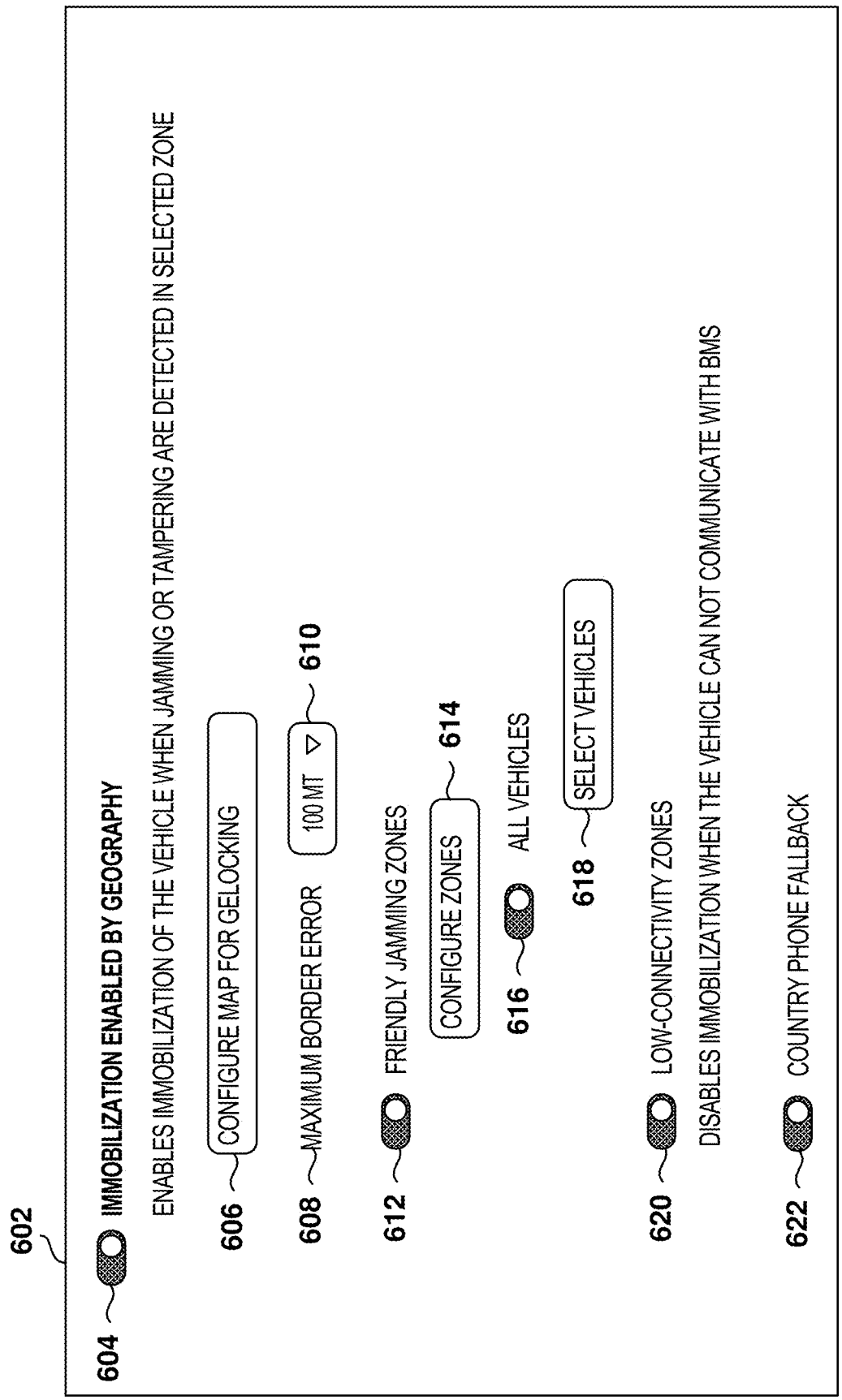
FIG. 6 is a UI for configuring immobilization by geography, according to some examples.

FIG. 6 shows a UI 602 for configuring immobilization by geography, according to some examples. The UI 602 includes a variety of interactive elements that allow a user to enable and configure settings related to vehicle immobilization based on geographic location and other conditions.

At the top of the UI 602, a toggle switch 604 is selectable to activate or deactivate the immobilization by geography. The accompanying text explains that this feature enables immobilization of the vehicle when jamming or tampering is detected in a selected zone.

Button 606 is for configuring the map for geographic locking, which allows the user to define the geographic area where immobilization should be enabled. If the button 606 is selected, a new UI is presented to define which areas will be enabled for vehicle immobilization.

Option 608 for configuring the maximum border error, which is the maximum error allowed for including a border area within a tile. For example, if the tile includes mostly an area of Mexico and a few meters of the United States (e.g., 50 meters), then the tile will be considered as covering only Mexico.

The pulldown menu 610 allows the user to select the tolerance (also referred to as the maximum error) from a plurality of values for the border error when defining the geofencing parameters. Some of the values may include 50, 100, 500, 1000 meters, etc.

Toggle switch 612 is for enabling or disabling friendly jamming zones. Some areas within Mexico include jammers to disable electronic signals, such as areas near a military installation. These areas are referred to as friendly jamming sounds because the jamming is not caused by a nefarious actor, so immobilization will not be necessary.

The toggle switch 612 is for disabling immobilization in these friendly jamming zones where local immobilization should not happen. The button 614 is selectable to configure these zones, and when selected, a new UI will be presented to define the friendly jamming zones. Typically, the friendly jammer zones are defined as a polygon.

Further, toggle switch 616 is configurable to configure the friendly jamming zones for all vehicles in the fleet or vehicle by vehicle. If the fleet administrator wishes to configure this option by vehicle, the button 618 may be selected to define which vehicles to configure.

Toggle switch 620 enables or disables immobilization in low-connectivity zones. The accompanying text explains that this setting disables immobilization when the vehicle cannot communicate with the BMS.

Certain regions in Mexico, such as mountainous areas, forests, and rural zones, experience low connectivity. Customers may configure to disable immobilization when vehicles traverse these regions. The aim is to prevent a scenario where a vehicle becomes immobilized in a location without internet access, thereby rendering the BMS dashboard unable to re-enable it.

Further, toggle switch 622 is for enabling country code fallback, which allows the system to use the country code provided by the mobile phone carrier in case the GPS signal is not available.

Figure 7:
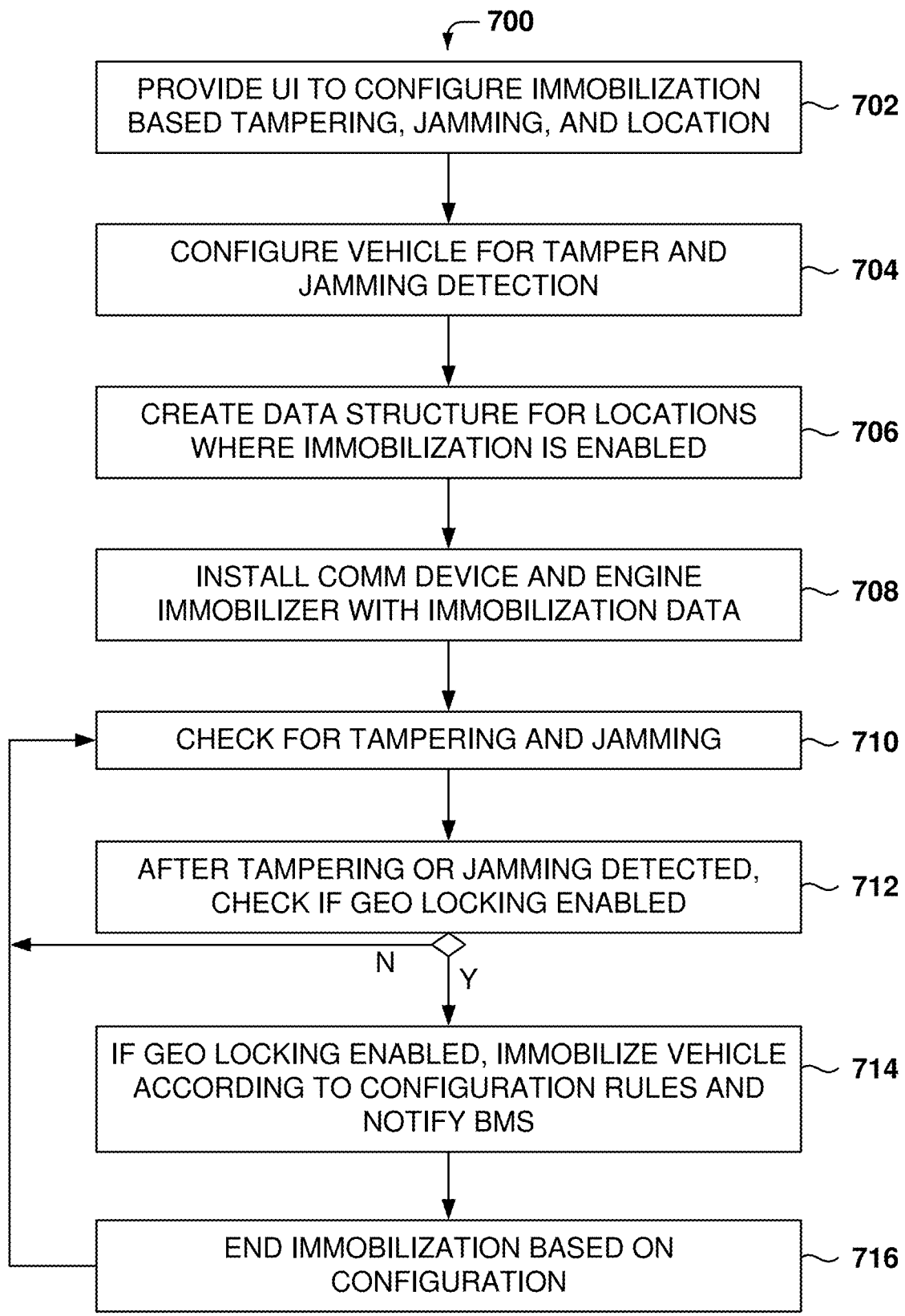
FIG. 7 is a flowchart of a method for enabling vehicle immobilization by geographic area, according to some examples.

FIG. 7 is a flowchart of a method 700 for enabling vehicle immobilization by geographic area, according to some examples. While the various operations in this flowchart are presented and described sequentially, one of ordinary skill will appreciate that some or all of the operations may be executed in a different order, combined, omitted, or executed in parallel.

The method 700 begins with operation 702, where a user interface (UI) is provided to configure immobilization based on tampering, jamming, and location.

Following operation 702, operation 704 involves configuring the vehicle for tamper and jamming detection. Next, operation 706 entails creating a data structure for the locations where immobilization is enabled. This operation establishes the geographical parameters within which the immobilization feature will be active.

The BMS prepares the data structure that defines the map where immobilization is enabled and then sends the map to the comm device in the vehicle. For example, the BMS will construct the hierarchical structure of Slippy tiles, defining areas where immobilization is enabled. Then, the comm device in the vehicle will automatically determine when to immobilize the vehicle if the vehicle is in an area where immobilization is enabled.

Operation 708 describes the installation of the comm device and engine immobilizer and provides the immobilization data to the comm devices. That is, the hardware and the software required for immobilization are configured in the vehicle.

From operation 708, the method 700 flows to operation 710, which involves checking for tampering and jamming in the vehicle. This is a continuous monitoring operation to ensure the security of the vehicle.

Upon detecting tampering or jamming, operation 712 checks if geographic locking (geo-locking) is enabled. This decision point leads to one of two paths: if geo-locking is not enabled, the process loops back to operation 710; if geo-locking is enabled, the method 700 moves to operation 714.

In operation 714, if geo-locking is enabled, the vehicle is immobilized according to configuration rules, and the BMS is notified.

From operation 714, the method 700 flows to operation 716 to end the immobilization process based on the configuration (e.g., after thirty minutes, after the GPS signal is recovered, after notification from the driver).

Figure 8:
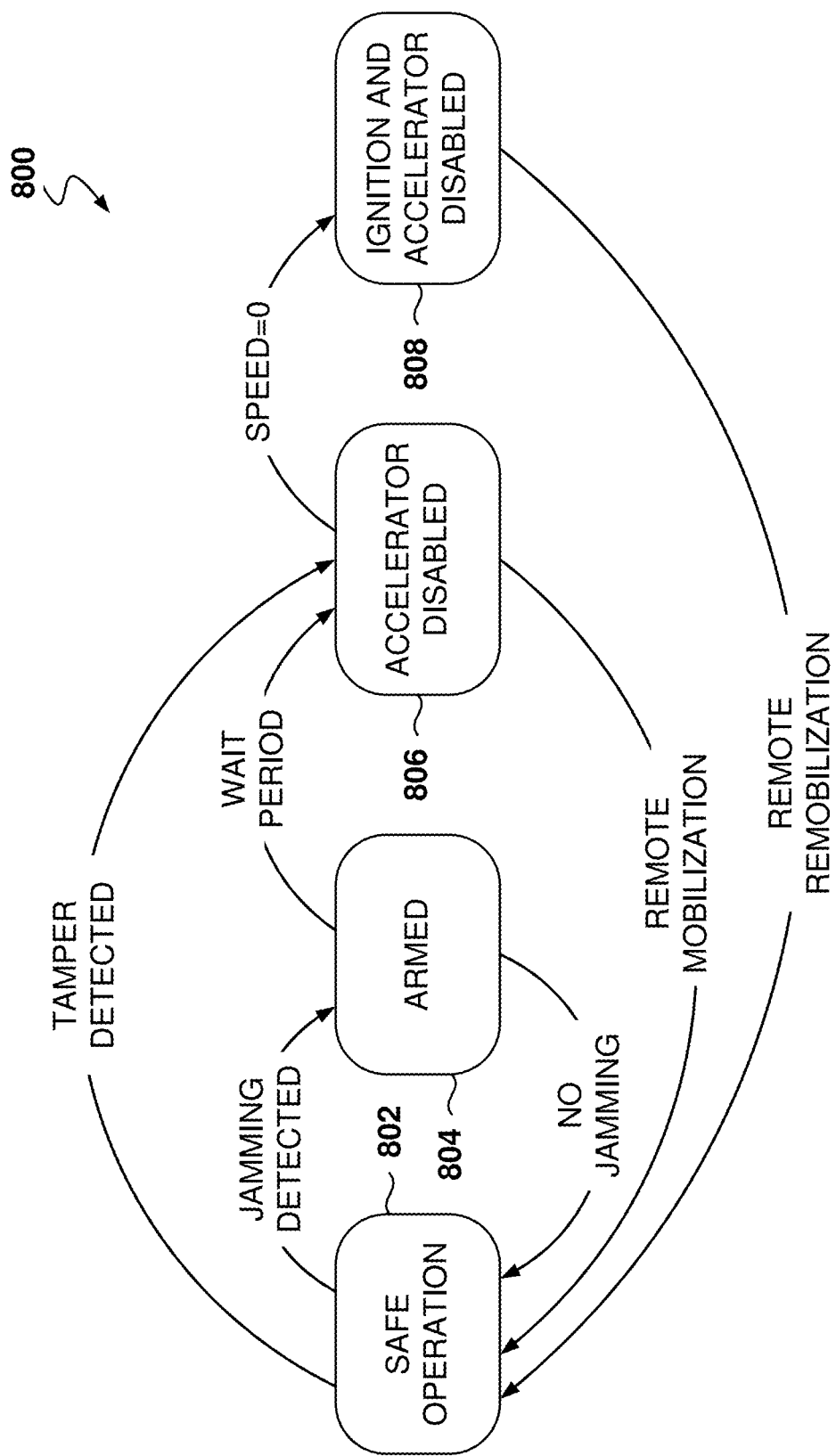
FIG. 8 is a state diagram showing tampering and jamming states, according to some examples.

FIG. 8 is a state diagram 800 showing tampering and jamming states, according to some examples. FIG. 8 does not include the check for geographic location, which is described in more detail below with reference to FIG. 9. It is noted that the examples illustrated in FIG. 8 do not describe every possible implementation. Other examples may utilize different states, different conditions for transitioning between states, etc. The examples illustrated in FIG. 8 should therefore not be interpreted to be exclusive or limiting, but rather illustrative.

There are various scenarios to consider regarding customizable logic related to the activation of safety mechanisms in the vehicle. In one scenario, the speed of the vehicle is a safety concern, where the vehicle should not be immobilized unless the vehicle speed is zero or very low (e.g., less than 5 or 10 mph). In some examples, the activation of the relays will be delayed until the vehicle speed reaches zero and a specific amount of time has passed.

In a theft scenario, if a thief realizes that the relays will not engage unless the vehicle slows down, they may choose to continue driving without stopping. However, after a certain period, it may be necessary to override the safety measures and activate one or more relays to immobilize the vehicle. This logic requires careful consideration and implementation to ensure the safety and security of the vehicle.

The state diagram 800 depicts various states through which the security system can transition based on certain conditions or inputs. The state 802 is for safe operation, which indicates normal vehicle operation without any security breaches detected.

If jamming is detected while at the state 802, the system transitions to a state 804, referred to as an armed state, indicating that jamming has been detected. If the end of the jamming condition is detected (e.g., no jamming currently), then the system transitions back from the state 804 to the state 802.

Further, if the system remains at the armed state 804 for a predefined wait time (e.g., 10 minutes), then the system transitions to the state 806, referred to as accelerator disabled, where the accelerator of the vehicle is disabled, e.g., the driver cannot use the accelerator, and as a result, the vehicle will slow down until it stops or moves at a very low speed (e.g., less than ten miles an hour). The benefit of the wait time before immobilizing the vehicle after detecting jamming is to reduce the number of false positives where some signal may interfere with the GPS signal and may be interpreted as jamming, while there may be other reasons for the loss of the GPS signal. If the jamming conditions remain for the wait period, then the system will proceed to immobilize the vehicle.

While at the state 806, when the speed of the vehicle is detected below a predetermined threshold (e.g., 5 miles an hour, 0 miles an hour), then the system transitions to a state 808, referred to as ignition and accelerator disabled, where both the ignition and the accelerator are disabled to immobilize the vehicle.

In some examples, a one-time passcode may be used to re-mobilize the vehicle. In case immobilization has happened and it occurs in a zone with no signal, if a driver needs to continue operations, there is no way to remobilize the vehicle after the allotted remobilization time has passed. In this scenario, an override command that could communicate from the driver app to the com device (e.g., sent via Bluetooth) that overrides the immobilization and re-mobilizes the vehicle would be helpful to avoid delays in operations or dangerous situations.

The state 806 and the state 808 are maintained until a remote mobilization command is received, which causes the system to transition back to the safe operation state 802.

Further, while the system is at the state 802, if tamper is detected (e.g., dashboard cover is removed), then the system transitions to the state 806, where the accelerator is immobilized.

Thus, the comm device 402 recognizes certain conditions and triggers a command to the engine immobilizer to open its relays (aka immobilize the vehicle) without requiring human input.

In some examples, a timer may be used to prompt, in the BMS UI, the re-mobilization process in the event of auto immobilization. This involves closing the relay to allow the vehicle to resume movement after a specified duration.

In some examples, the vehicle will automatically re-mobilize after a specified period (e.g., 45 minutes), and the system will transition back to the state 802.

Auto mobilization can be inadequate in some situations, e.g., the vehicle stops at a toll booth, a checkpoint, or the entrance to a customer site. To avoid these situations, in some examples, a snooze option is provided to delay immobilization temporarily, and the snooze option is available in the BMS UI setting or the driver app.

In some examples, an option for stranger detection is configured to perform AI image recognition of the inward camera to identify whether the driver of the vehicle has changed, a secondary passenger has boarded the vehicle, or a firearm has been identified. In some examples, if the cam device detects any of these conditions, the cam device notifies the com device of the hazardous situation, and the com device will immobilize the vehicle.

In some examples, another tempering condition may be triggered when there is a vehicle door tempering. For example, some intruders may attempt to board a vehicle while in motion to take control of the vehicle. If this condition is triggered, auto-immobilization will be triggered to stop a theft from happening. The opening of the door may be detected by the com device or the cam device, and the speed of the vehicle is also available based on information from the diagnosis port or GPS information.

In some examples, if the cam device is installed in the vehicle, image information may also be used. For example, if jamming or tampering is detected, the notification to the BMS may include images from the inside and the outside of the vehicle.

In some examples, image information may also be used to trigger immobilization, such as when more than one person is detected in the cabin (or more than two people), which may be an indication of a carjacking.

In some examples, the engine immobilizer is a magnet-actuated switch that is connected to the dashboard cover, so when the dashboard cover is removed, the engine immobilizer detects the separation of the magnet, indicating a potential tampering situation. The engine immobilizer can be installed in different parts of a vehicle, such as the ignition or the acceleration line. For example, the engine immobilizer works by deactivating the accelerator through a relay that opens the circuit and disconnects the wire for the accelerator. To bypass the engine immobilizer, a potential thief would need to locate the engine immobilizer and reroute the accelerator line, an operation that may be difficult and take a long time.

When a thief gains unauthorized access to a vehicle and forcibly removes the dashboard to reach the comm device 402, causing the magnets to disconnect, it is identified as a tampering, dangerous, and malicious event. In this scenario, the engine immobilizer is autonomously triggered by the comm device 402 upon detecting the tampering.

The comm device 402 communicates with the engine immobilizer to instruct the engine immobilizer to stop the vehicle and immobilize it. This autonomous response sets this solution apart from others in the market, as it does not require remote intervention or manual execution after receiving a notification. Furthermore, there is no dependency on external commands from the server as all actions are self-contained within the comm device 402.

Thieves may attempt to bypass the engine immobilizer, but this requires significant effort as it involves removing the dashboard. In some regions, professional thieves may still find ways to re-mobilize the vehicle, but the added complexity can act as a deterrent. Companies benefit from increased recovery time for stolen vehicles and discourage thieves by making re-mobilization more challenging. Even if the thieves manage to disconnect the comm device 402, the immobilization command will still be executed. This means that the vehicle will remain immobilized even if the comm device 402 is disconnected.

Figure 9:
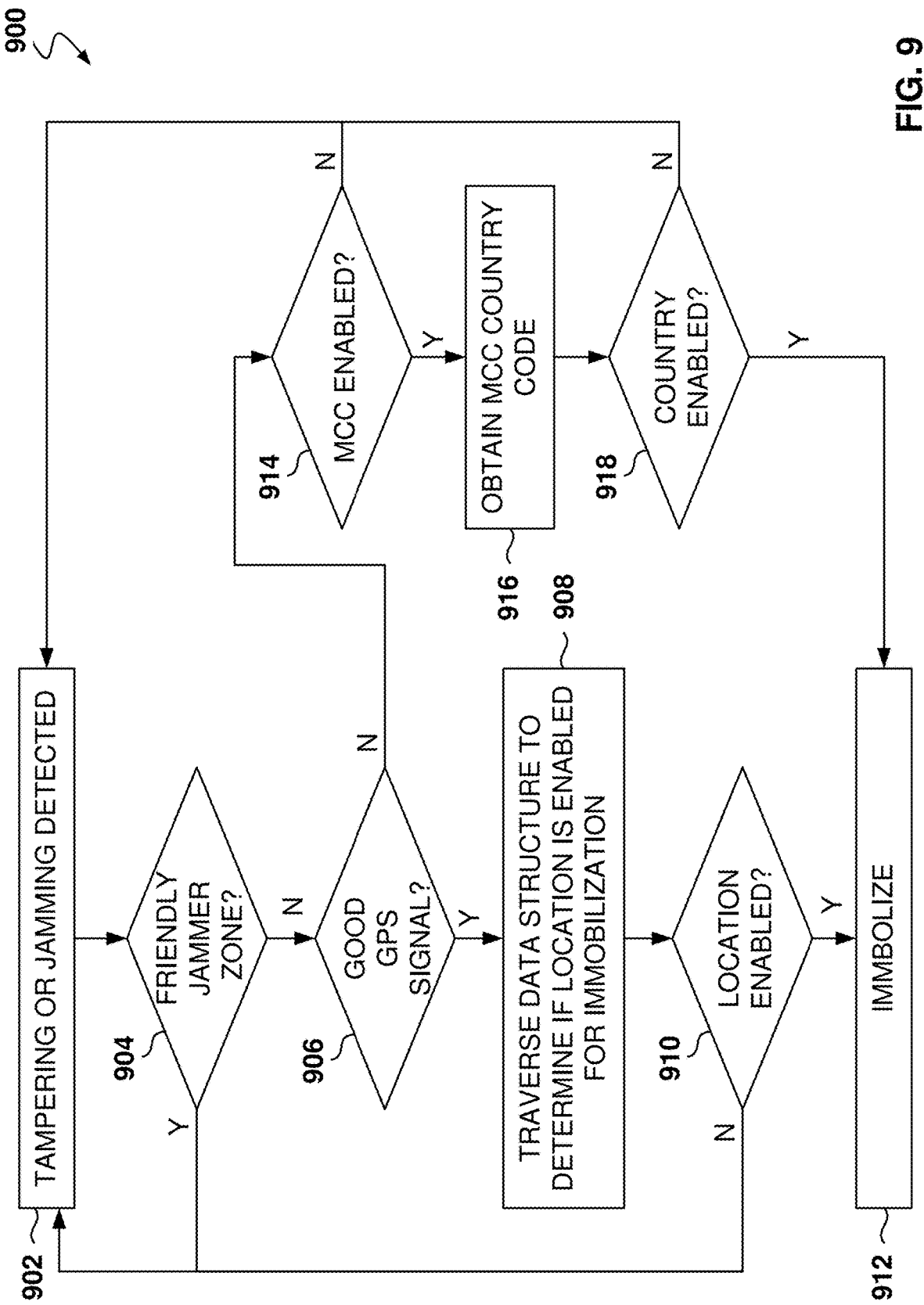
FIG. 9 is a flowchart of a method to determine where to immobilize, according to some examples.

FIG. 9 is a flowchart of a method 900 to determine where to immobilize, according to some examples. While the various operations in this flowchart are presented and described sequentially, one of ordinary skill will appreciate that some or all of the operations may be executed in a different order, be combined or omitted, or be executed in parallel.

At operation 902, tampering or jamming is detected. Following the detection, the method 900 proceeds to operation 904 to determine if the detected jamming is occurring within a friendly jammer zone. If the answer is "Yes," the method 900 loops back to operation 902, indicating that no further action is required. If the answer is "No," the method 900 moves to operation 906.

At operation 906, the system checks whether a good GPS signal is available. If the GPS signal is not good, the method 900 branches to operation 914. If the GPS signal is good, the method 900 continues to operation 908.

In operation 908, the system traverses a data structure to determine if the current location is enabled for immobilization. The system then evaluates the result of the data structure traversal in operation 910. If the location is enabled for immobilization, the method 900 proceeds to operation 912. If the location is not enabled, the method 900 loops back to operation 902.

In operation 912, the system performs the immobilization action.

If the method 900 branched to operation 914 due to a poor GPS signal, the system checks if the option to immobilize based on Mobile Country Code (MCC) is enabled. There are cases where the GPS lock is unavailable or insufficient, leading to a fallback on the knowledge of the cellular carrier. There are criteria in place to determine the reliability of GPS lock and resolution based on the GPS signal reception. If the criteria indicate that the GPS signal is not adequate to determine the position, the system resorts to a cellular MCC-based algorithm. The preference is for immobilizing based on the GPS location, but if the GPS location can not be obtained, the cellular MCC algorithm serves as a fallback.

If the MCC is not enabled, the method 900 loops back to operation 902. If the MCC option is enabled, the method 900 moves to operation 916.

In operation 916, the system obtains the MCC country code from the cellular carrier.

From operation 916, the method 900 flows to operation 918 to check if the country corresponding to the obtained MCC code is enabled for immobilization. If the country is enabled, the method 900 proceeds to operation 912 to immobilize. If the country is not enabled, the method 900 loops back to operation 902.

Figure 10:
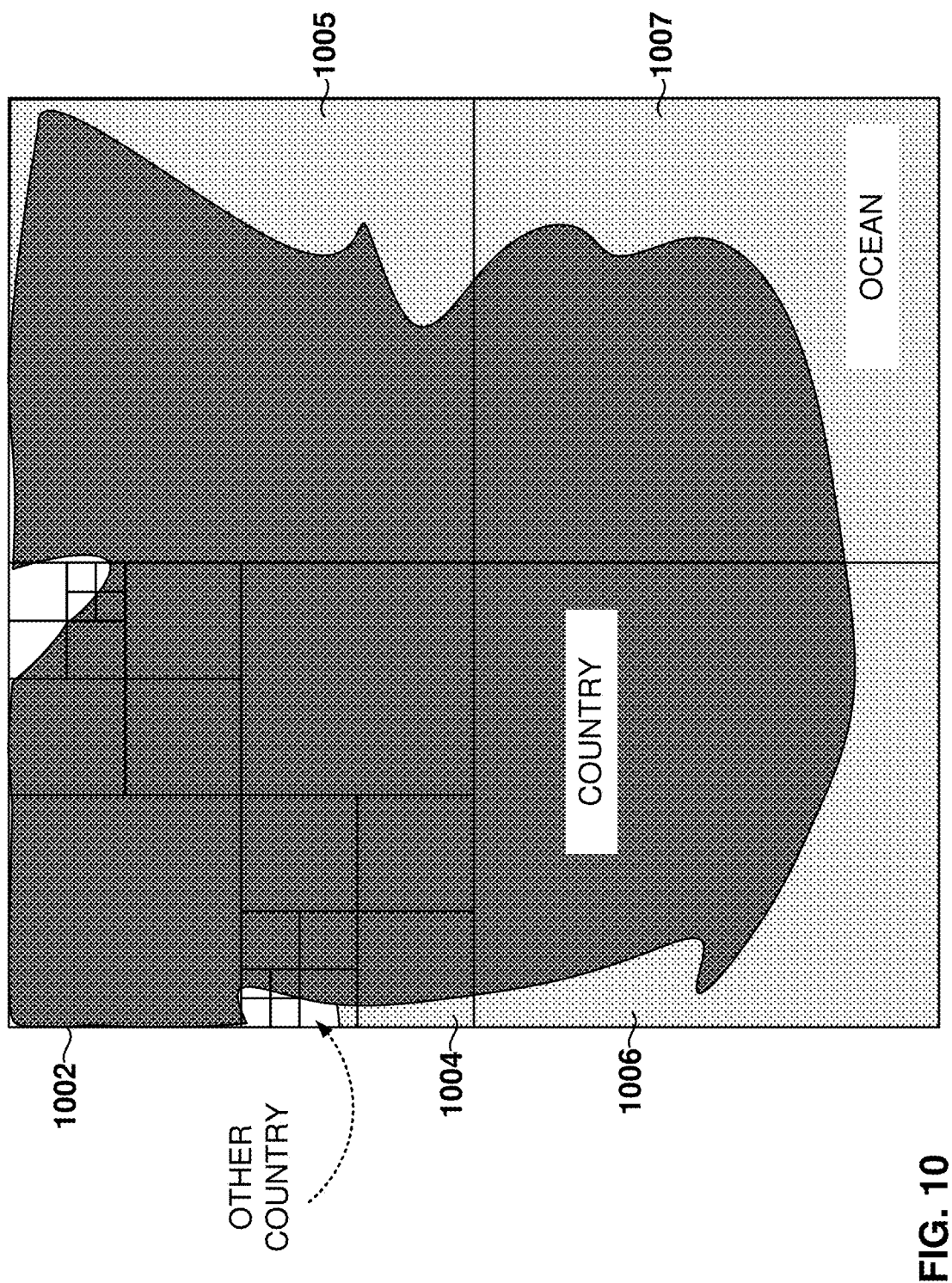
FIG. 10 illustrates the creation of nodes at different zoom levels, according to some examples.

FIG. 10 illustrates the creation of nodes at different zoom levels, according to some examples. Map 1002 covers the country where geographic immobilization is allowed, another country where geographic immobilization is not allowed, and ocean areas. The goal is to create a data structure for this map that enables the comm device to determine if the current location is enabled for immobilization.

Since map 1002 encompasses regions where immobilization is both permitted and prohibited, map 1002 is segmented into four distinct tiles, specifically tiles 1004-1007. Tiles 1005-1007 encompass both the country and ocean waters, eliminating the need for further division into children tiles due to the assumption that ocean waters are designated as areas where immobilization is permitted, given that land vehicles do not operate in ocean waters.

The tile that covers the whole map 1002 is then divided into four tiles, 1004, 1005, 1006, and 1007, where the top-left tile 1004 and the bottom-right tile 1007 cover country land so they do not have to be divided into children tiles. The top-right tile 1005 and the bottom-left tile 1006 include parts of the country and the other country, so they are divided again into four tiles.

The process continues until a tile covers only water or part of the country, or the maximum resolution is allowed. It is noted that if there is a small part of the other country in a tile within the configured margin of error, then the tile will be assumed to cover only country land. In some examples, the threshold distance within the country is set to 1 km, but other threshold distances may be used, such as in the range from 1 m to 5 km or more.

By implementing optimized large rectangles to cover the majority of the country and focusing on detailed representations near borders, the data structure provides in-depth information for determining organizational permissions at border regions.

Figure 11A:
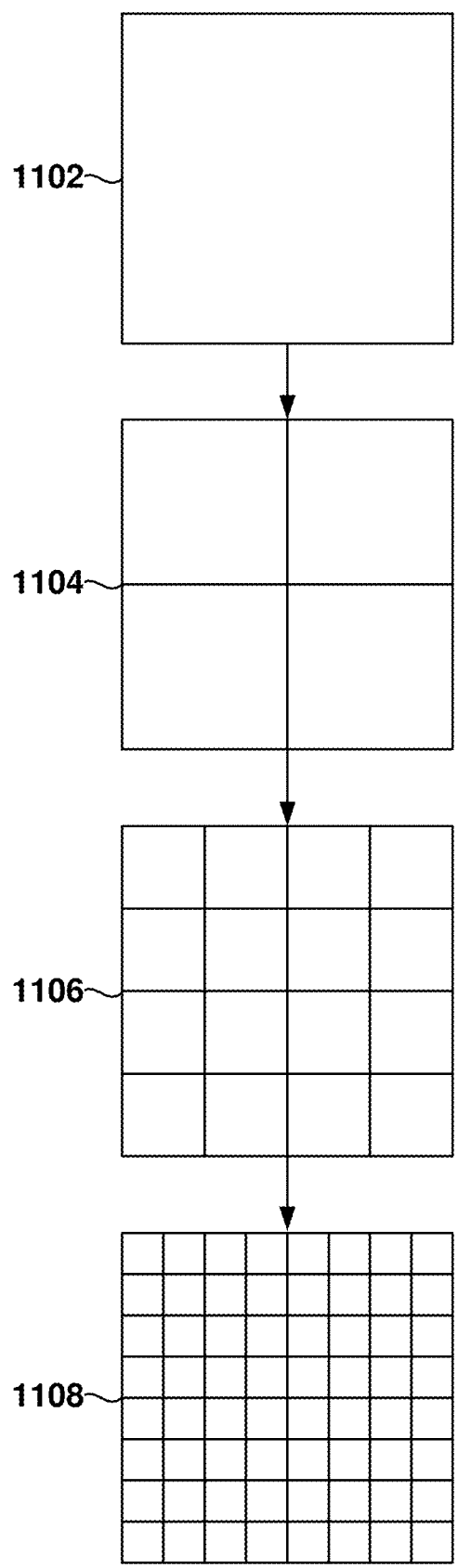
FIGS. 11A-11D illustrate the creation of map tiles with different zoom levels, according to some examples.

FIGS. 11A-11D illustrate the creation of map tiles with different zoom levels, according to some examples. FIG. 11A illustrates the creation of a data structure where all the tiles of a given zoom level are subdivided until reaching the leaf nodes, which means that the leaf nodes are all at the same zoom level.

Figure 11B:
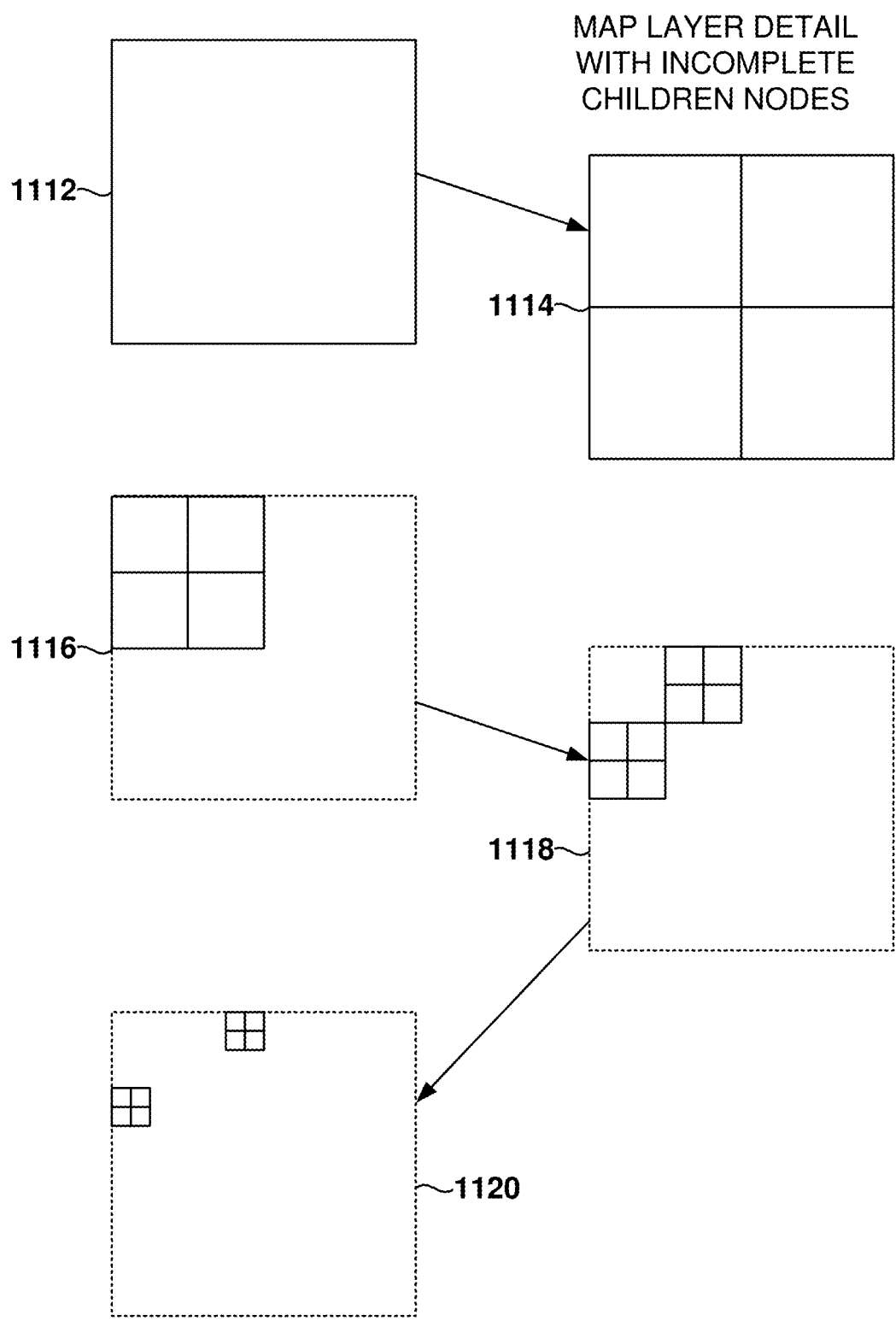

FIG. 11B illustrates the creation of a data structure in which tiles are subdivided if the tile contains areas where immobilization is allowed and areas where immobilization is not allowed until reaching the leaf nodes. This means that the leaf nodes may be at different zoom levels.

In FIG. 11A, a root tile 1102 is divided into four root tiles 1104, then each of these tiles is further divided into tiles 1106, and these are divided into tiles 1108. This creates a tree data structure with symmetry where all the leaf nodes have four children except for the leaf nodes.

In FIG. 11B, a root tile 1112 is divided into four root tiles 1114. At the next level, only the top-left tile is divided into four tiles because the other tiles cover the target country, water areas, or part of another country within the allowed margin of tolerance. The other tiles are leaf nodes because they are not further subdivided.

The result consists of tiles 1116, which are further subdivided into tiles 1118. It is observed that the top-right and bottom-left tiles are subdivided while the top-left and bottom-right tiles remain as leaf nodes. The process continues, resulting in the division of two tiles into tiles 1120.

A complete approach would store the coordinates of the node and pointers to the four children nodes in each node. The coordinates include the x and y coordinates (also referred to as East and North coordinates) and the zoom level.

The optimized data structure includes four pointers to the child nodes. The coordinates of the node and zoom level may be deduced based on the structure of the tree: the x and y coordinates of the children are determined based on the x and y coordinates of the parent, and the zoom level of the children is equal to the zoom level of the parent node plus one.

Not dividing a large number of nodes that are entirely within the country leads to a significant reduction in data storage. When a node has no children, then the children pointer values will not exist (e.g., a nil value) to indicate the absence of children. Children nodes that do not exist are understood as being outside the country where immobilization is allowed.

Figure 11C:
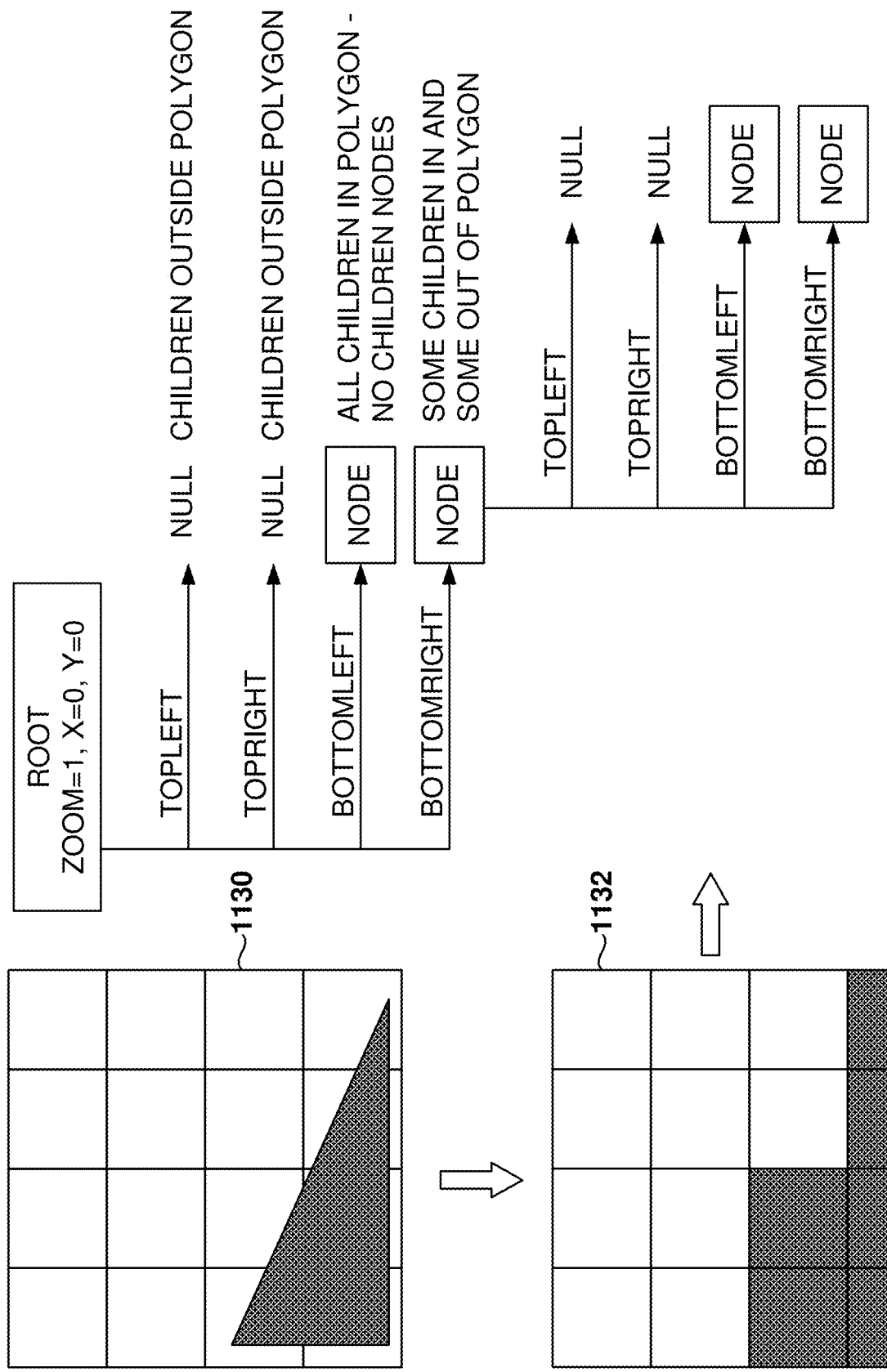

FIG. 11C shows a simple example illustrating the creation of tiles and nodes. The map 1130 includes 16 tiles at level three. A triangle shows the area where immobilization is enabled, and the rest of the map covers the area where immobilization is not allowed. For this example, zoom level 3 is considered to correspond to the maximum resolution for the map, e.g., a margin of error of 500 meters, and each tile at zoom 3 is 200 by 200 meters. Therefore, some of the tiles that cover part of the triangle will be considered as enabled zones.

The map 1132 shows the enabled nodes as shaded tiles and the nodes that are not enabled as white tiles. These tiles correspond to a data structure with the root node and some child nodes underneath.

The root node has zoom level 1, x equal to 0, y equal to zero, and four pointers. Each quadrant under the root node covers four tiles of the map 1132. The top-left quadrant only has disabled tiles; therefore, the corresponding pointer would be null, indicating that there are no children, and this quadrant is for an area that is disabled for immobilization. The top-right quadrant also has a null pointer for the same reason.

The bottom-left quadrant is for an area that is completely enabled, so a child node is created for this quadrant. However, since the bottom-left quadrant is completely enabled, no child nodes have to be created.

The bottom-right quadrant has two enabled tiles and two disabled tiles. The top-left and top-right tiles are disabled, so the nodes are not created in the data structure, and the corresponding pointers are set to a null value. The bottom-left tile and the bottom-right tiles are completely enabled, so the nodes are created without child nodes.

The result is that instead of storing six tiles (assuming 8 bytes per node, it would require 48 bytes) that are enabled for zoom level three, only five nodes are stored (assuming 4 bytes per node plus ten extra bytes for the root would mean 30 bytes total).

Figure 11D:
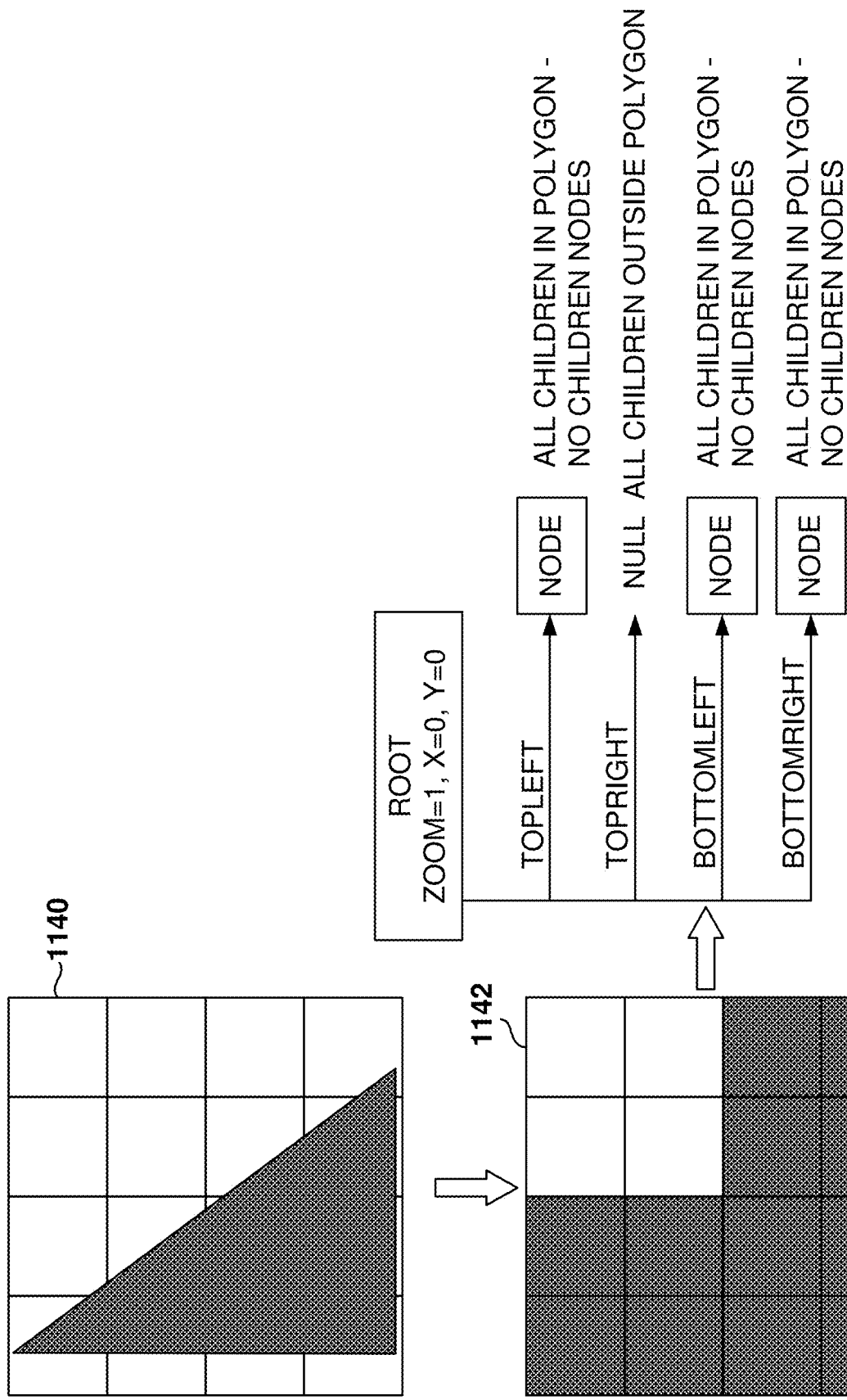

FIG. 11D shows another example illustrating the creation of tiles and nodes. The map 1140 includes 16 tiles at level three. A triangle shows the area where immobilization is enabled, and the rest of the map covers the area where immobilization is not allowed. As in the previous example, zoom level 3 is considered to correspond to the maximum resolution for the map, e.g., a margin of error of 500 meters, and each tile at zoom 3 is 200 by 200 meters. Therefore, some of the tiles that cover part of the triangle will be considered as enabled zones.

The map 1142 shows the enabled nodes as shaded tiles and the nodes that are not enabled as white tiles. These tiles correspond to a data structure with the root node and some child nodes underneath.

The root node has zoom level 1, x equal to 0, y equal to zero, and four pointers. Each quadrant under the root node covers four tiles of the map 1142. The top-left, bottom-left, and bottom-right quadrants only have enabled tiles, so corresponding child nodes are created, but since they are completely enabled, no child nodes will be created underneath.

The top-right quadrant is for an area that is completely disabled; therefore, the corresponding pointer would be null, indicating that there are no children, and this quadrant is for an area that is disabled for immobilization.

The result is that instead of storing six tiles (assuming 8 bytes per node, it would require 48 bytes) that are enabled for zoom level three, only five nodes are stored (assuming 4 bytes per node plus ten extra bytes for the root would mean 30 bytes total).

This example shows more considerable storage savings. This structure would take four times four bytes plus ten bytes for the root, which is 26 bytes. If 12 tiles were created instead, eight bytes per tile, then 96 bytes would be needed, which is more than three times with the presented techniques.

These are simple examples, but as the area gets more extensive (e.g., a whole country), the savings become much more substantial.

Figure 12:
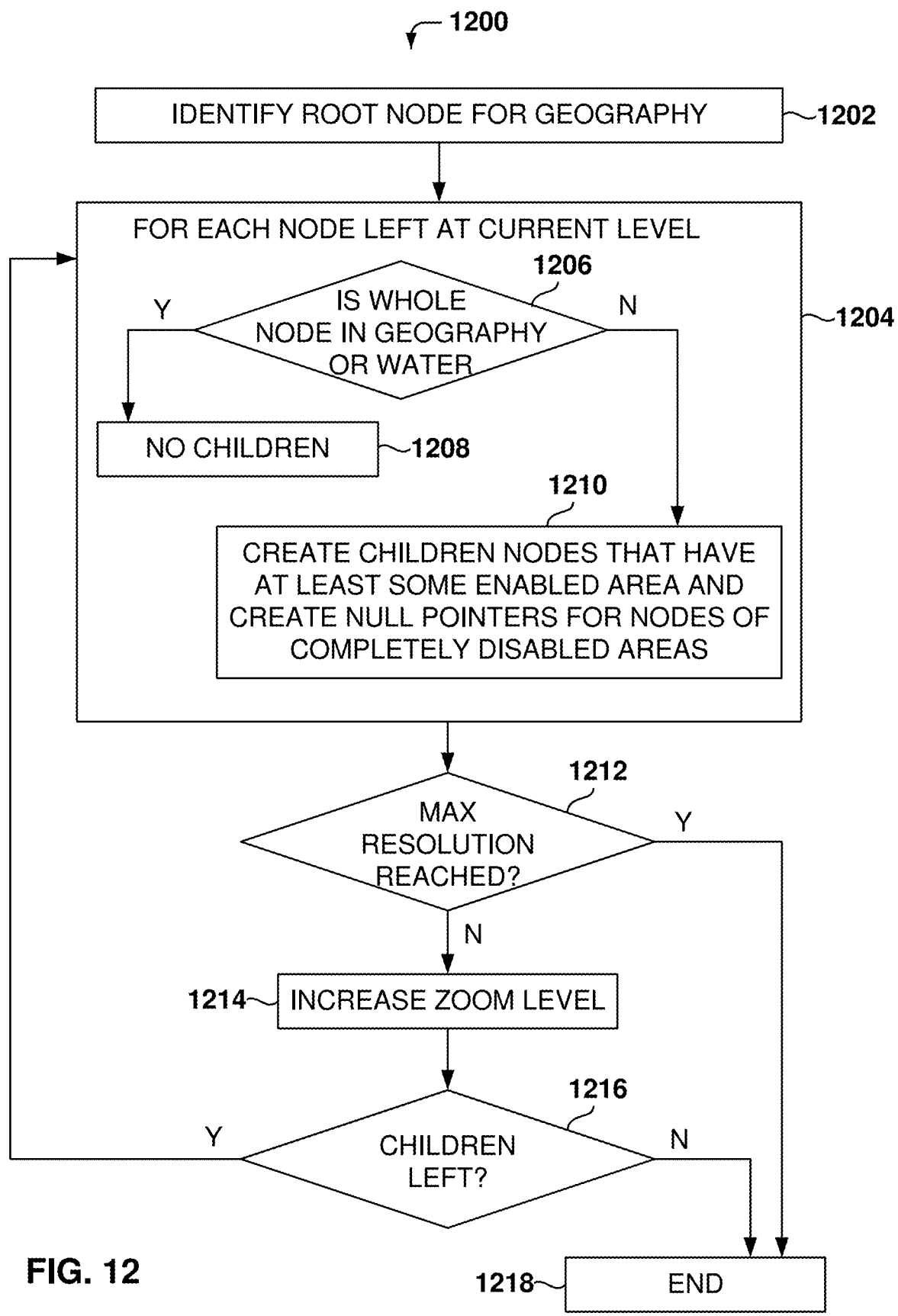
FIG. 12 is a flowchart of a method for generating a map data structure, according to some examples.

FIG. 12 is a flowchart of a method 1200 for generating a map data structure, according to some examples. While the various operations in this flowchart are presented and described sequentially, one of ordinary skill will appreciate that some or all of the operations may be executed in a different order, be combined or omitted, or be executed in parallel.

Operation 1202 is for identifying root nodes for the geography where immobilization is being configured. Further, operation 1204 is performed for each node left at the current level to determine if the note will be subdivided. Operation 1204 includes operations 1206, 1208, and 1210. Operation 1204 iterates through the nodes left.

Operation 1206 is a check to determine whether the whole node (e.g., the area of the map associated with the node) is in the enabled geographical region or a water area. If the node is in the geography or water, the method 1200 proceeds to operation 1208, and if the node is not in the geography or water, the method 1200 moves to operation 1210.

At operation 1208, the node is not split; that is, no children nodes are created because this node corresponds to an area where immobilization is enabled; that is, the node will be a leaf node. Operation 1210 is to create child nodes that have at least some area where immobilization is allowed, and nodes are not created for areas that would be completely disabled or have water areas; that is, null pointers are created to indicate that these nodes do not exist.

From operation 1204, the method 1200 flows to operation 1212, which is another decision point to check if the maximum resolution has been reached. If the maximum resolution is reached, the method 1200 moves to operation 1218, where the creation of the map data structure is completed. If the maximum resolution has not been reached, the method 1200 continues to operation 1214, where the zoom level is increased to begin assessing nodes at the lower level.

From operation 1214, the method 1200 flows to operation 1216, which is a decision point to check if there are any children nodes left. If there are children nodes left, the method 1200 loops back to operation 1204 to continue processing the remaining nodes. If no children nodes are left, the method 1200 proceeds to operation 1218 to end the generation of the map data structure.

Figure 13:
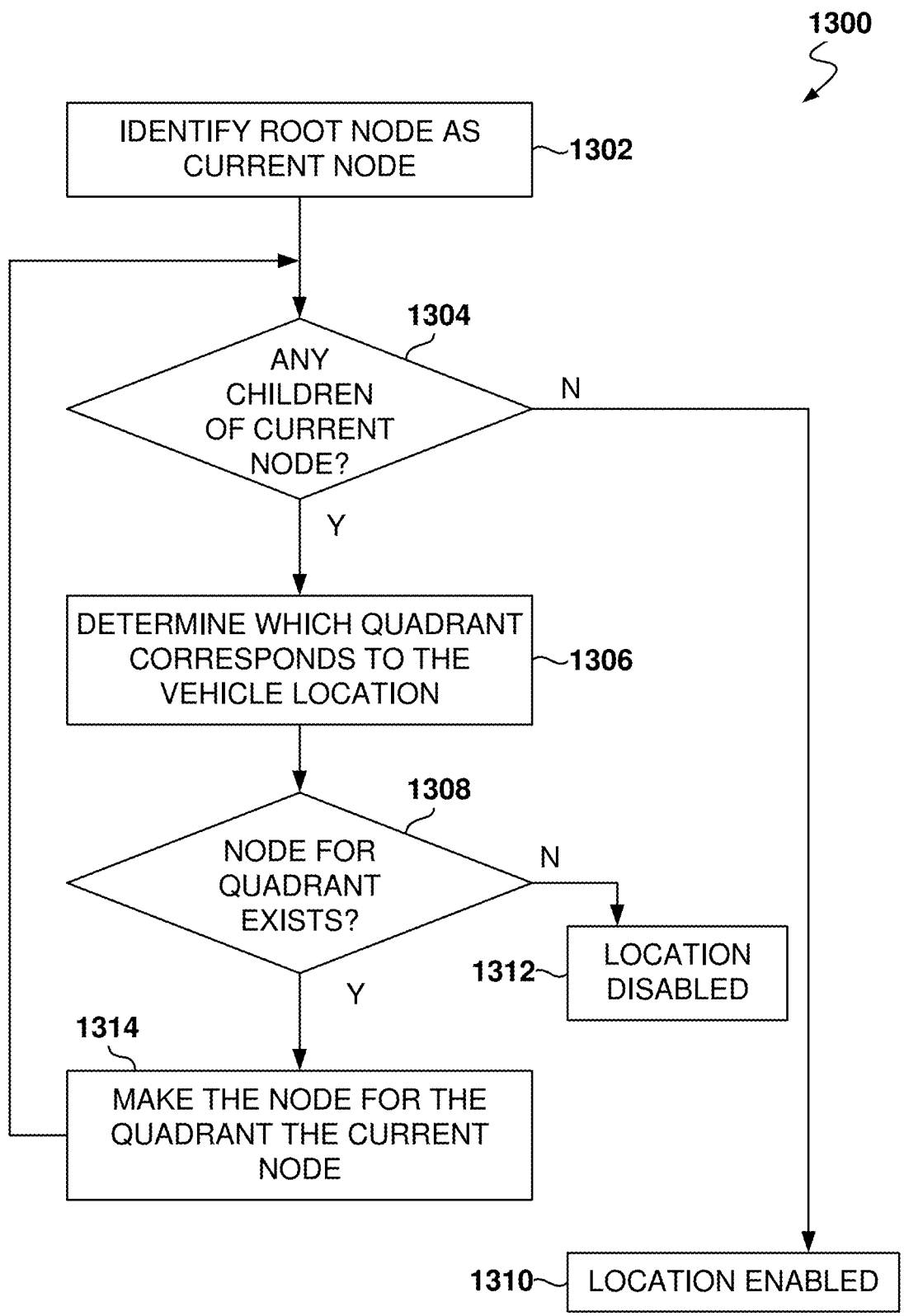
FIG. 13 is a flowchart of a method for determining whether immobilization is enabled in the location of the vehicle, according to some examples.

FIG. 13 is a flowchart of a method 1300 for determining whether immobilization is enabled in the location of the vehicle, according to some examples. While the various operations in this flowchart are presented and described sequentially, one of ordinary skill will appreciate that some or all of the operations may be executed in a different order, be combined or omitted, or be executed in parallel.

Operation 1302 is to identify the root node as the current node being examined to determine immobilization by location. This operation initializes the traversal of the node structure.

From operation 1302, the method 1300 flows to operation 1304, which is a decision point to check if the current node has any child nodes. If the current node has children, the method 1300 proceeds to operation 1306, and if the current node does not have children, the method 1300 moves to operation 1310.

Operation 1306 is to determine which quadrant corresponds to the vehicle location. This operation involves determining which quadrant, from the four quadrants of the parent node, corresponds to the vehicle's current location.

Operation 1308 is a check to determine if the determined quadrant corresponds to a node that exists. If a node exists, the process continues to operation 1314. If not, the process moves to operation 1312, indicating that the location is disabled.

Operation 1314 is for making the node that corresponds to the determined quadrant the current node. The method 1300 then loops back to operation 1304 to continue the evaluation.

Operation 1310 is for marking the location of the vehicle as enabled for immobilization.

Figure 14:
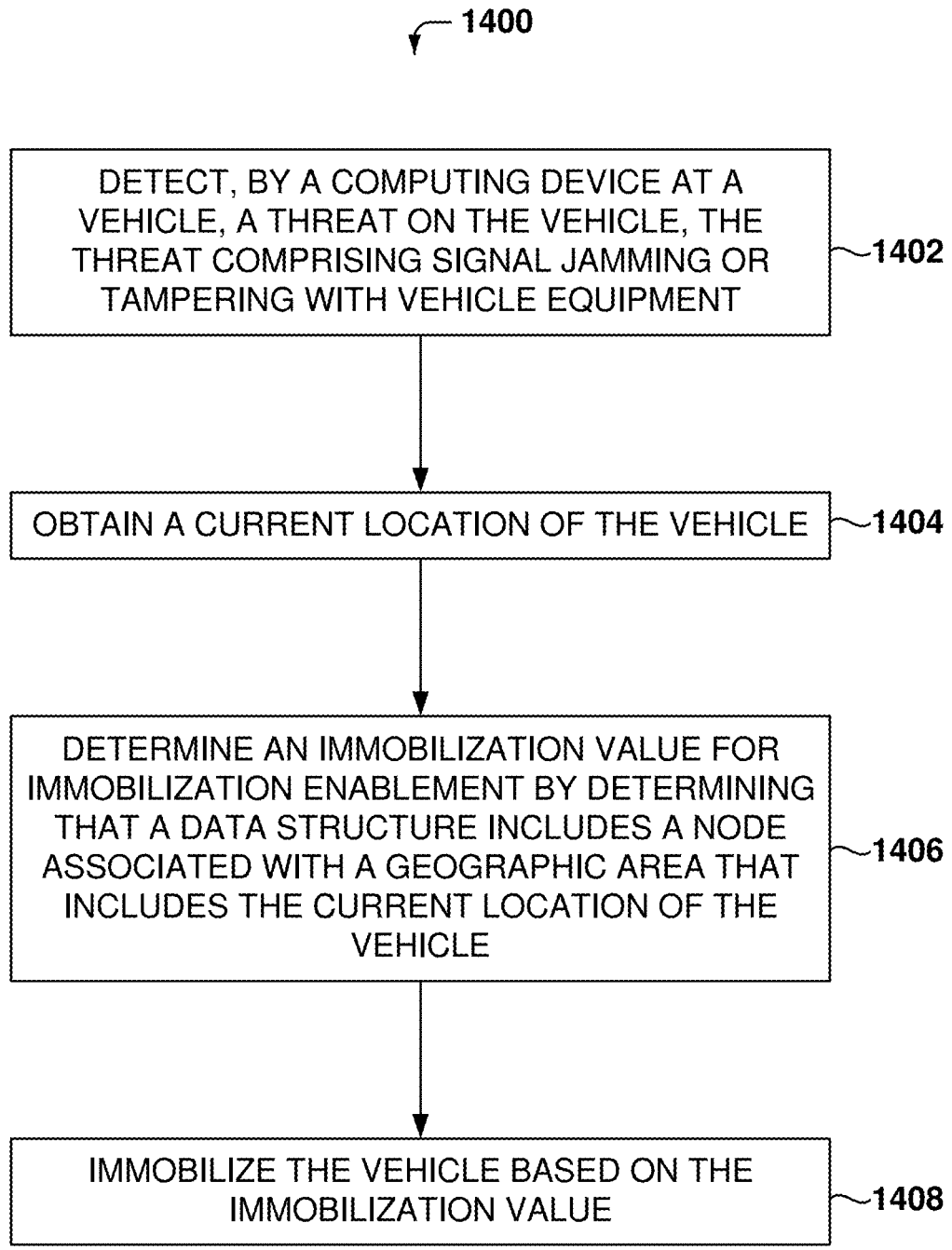
FIG. 14 is a flowchart of a method for enabling vehicle immobilization based on location, according to some examples.

FIG. 14 is a flowchart of a method 1400 for enabling vehicle immobilization based on location, according to some examples. While the various operations in this flowchart are presented and described sequentially, one of ordinary skill will appreciate that some or all of the operations may be executed in a different order, be combined or omitted, or be executed in parallel.

Operation 1402 is for detecting, by a computing device at a vehicle, a threat on the vehicle, the threat comprising signal jamming or tampering with vehicle equipment.

From operation 1402, the method 1400 flows to operation 1404 for obtaining a current location of the vehicle.

From operation 1404, the method 1400 flows to operation 1406 to determine an immobilization value for immobilization enablement by determining that a data structure includes a node associated with a geographic area that includes the current location of the vehicle From operation 1406, the method 1400 flows to operation 1408 for immobilizing the vehicle based on the immobilization value.

In some examples, the immobilization value is enabled for the node associated with a section of a map that covers land and water areas and the node is a leaf node without children nodes.

In some examples, the method 1400 further comprises detecting that the current location of the vehicle is in a friendly jamming zone, and canceling immobilizing the vehicle based on detecting that the current location of the vehicle is in the friendly jamming zone.

In some examples, a root node of the data structure comprises a horizontal coordinate, a vertical coordinate, a zoom level, and four pointers to children nodes, where nodes under the root node comprise the four pointers to children nodes and do not comprise the horizontal coordinate, the vertical coordinate, and the zoom level.

In some examples, the method 1400 further comprises generating the data structure at a server, and sending the data structure to the computing device at the vehicle.

In some examples, generating the data structure comprises analyzing nodes by level starting at a root node, and, for each node at a given level, splitting the given node if the given node covers a land area where immobilization is allowed and a land area where immobilization is not allowed, and making the given node a leaf node if the given node covers the land area where immobilization is allowed or a water area.

In some examples, the method 1400 further comprises identifying a root node as a current node, and recursively traversing the data structure to determine the immobilization value.

In some examples, recursively checking if the current node has children further comprises determining that the current node has children; in response to determining that the current node has children, determining which quadrant of the current node corresponds to the location of the vehicle; determining if the node for the quadrant is present or missing; in response to determining that the node for the quadrant is missing, setting the immobilization value to disabled and ending the recursive checking; and in response to determining that the node for the quadrant is present, making the node for the determined quadrant the current node and continuing the recursive checking.

In some examples, recursively checking if the current node has children further comprises determining that the current node has no children, and, in response to determining that the current node has no children, setting the immobilization value to enabled.

In some examples, the method 1400 further comprises providing a user interface (UI) for configuring immobilization based on location, the UI comprising options for the immobilization enablement by location, configuring a map to define where immobilization is enabled, maximum border error, and friendly jamming zones.

In some examples, the method 1400 further comprises detecting that GPS signal is not adequate to determine the current location of the vehicle, and utilizing a value of a mobile country code (MCC) to enable immobilization based on the MCC.

In some examples, the threat is signal jamming, where immobilizing the vehicle further comprises, after a predefined wait time, disabling an accelerator in the vehicle, and, after disabling the accelerator and detecting that the vehicle has stopped, disabling an ignition of the vehicle.

Another general aspect is for a system that includes a memory comprising instructions and one or more computer processors. The instructions, when executed by the one or more computer processors, cause the one or more computer processors to perform operations comprising: detecting, by a computing device at a vehicle, a threat on the vehicle, the threat comprising signal jamming or tampering with vehicle equipment; obtaining a current location of the vehicle; determining an immobilization value for immobilization enablement by determining that a data structure includes a node associated with a geographic area that includes the current location of the vehicle; and immobilizing the vehicle based on the immobilization value.

In yet another general aspect, a tangible machine-readable storage medium (e.g., a non-transitory storage medium) includes instructions that, when executed by a machine, cause the machine to perform operations comprising: detecting, by a computing device at a vehicle, a threat on the vehicle, the threat comprising signal jamming or tampering with vehicle equipment; obtaining a current location of the vehicle; determining an immobilization value for immobilization enablement by determining that a data structure includes a node associated with a geographic area that includes the current location of the vehicle; and immobilizing the vehicle based on the immobilization value.

Figure 15:
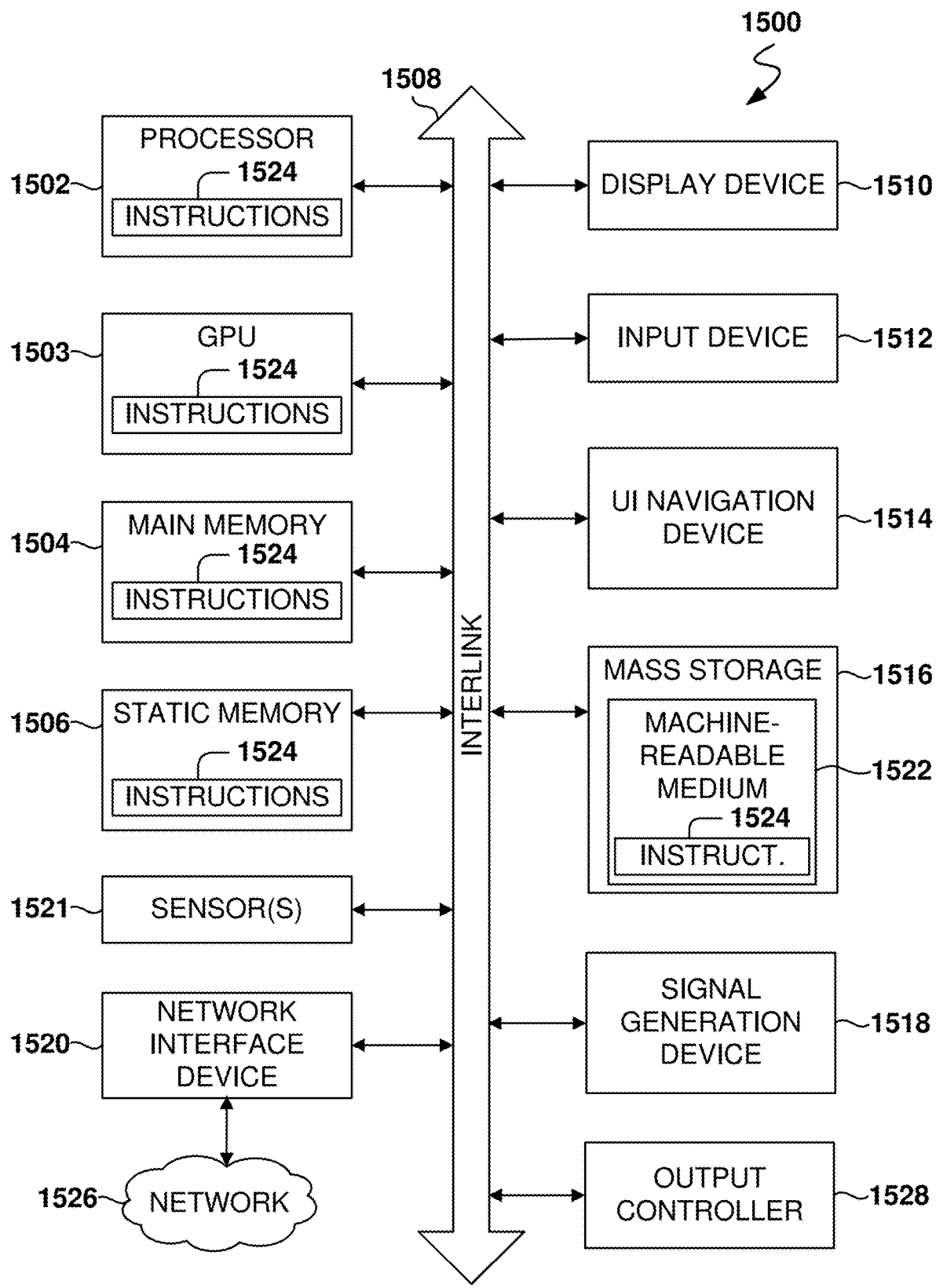
FIG. 15 is a block diagram illustrating an example of a machine upon or by which one or more example process examples described herein may be implemented or controlled.

FIG. 15 is a block diagram illustrating an example of a machine 1500 upon or by which one or more example process examples described herein may be implemented or controlled. In alternative examples, the machine 1500 may operate as a standalone device or be connected (e.g., networked) to other machines. In a networked deployment, the machine 1500 may operate in the capacity of a server machine, a client machine, or both in server-client network environments. In an example, the machine 1500 may act as a peer machine in a peer-to-peer (P2P) (or other distributed) network environment. Further, while only a single machine 1500 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, various components, or mechanisms. Circuitry is a collection of circuits implemented in tangible entities, including hardware (e.g., simple circuits, gates, logic). Circuitry membership may be flexible over time and underlying hardware variability. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits), including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other circuitry components when the device operates. In an example, any of the physical components may be used in more than one member of more than one circuitry. For example, under operation, execution units may be used in a first circuit of a first circuitry at one point in time and reused by a second circuit in the first circuitry or by a third circuit in a second circuitry at a different time.

The machine 1500 (e.g., computer system) may include a hardware processor 1502 (e.g., a central processing unit (CPU), a hardware processor core, or any combination thereof), a graphics processing unit (GPU 1503), a main memory 1504, and a static memory 1506, some or all of which may communicate with each other via an interlink 1508 (e.g., bus). The machine 1500 may further include a display device 1510, an alphanumeric input device 1512 (e.g., a keyboard), and a user interface (UI) navigation device 1514 (e.g., a mouse). In an example, the display device 1510, alphanumeric input device 1512, and UI navigation device 1514 may be a touch screen display. The machine 1500 may additionally include a mass storage device 1516 (e.g., drive unit), a signal generation device 1518 (e.g., a speaker), a network interface device 1520, and one or more sensors 1521, such as a Global Positioning System (GPS) sensor, compass, accelerometer, or another sensor. The machine 1500 may include an output controller 1528, such as a serial (e.g., universal serial bus (USB)), parallel, or other wired or wireless (e.g., infrared (IR), near field communication (NFC)) connection to communicate with or control one or more peripheral devices (e.g., a printer, card reader).

The processor 1502 refers to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor 1502 may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof.

The processor 1502 may further be a multi-core processor having two or more independent processors (sometimes referred to as "cores") that may execute instructions contemporaneously. Multi-core processors contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. The processor 1502 may be emulated in software, running on a physical processor, as a virtual processor or virtual circuit. The virtual processor may behave like an independent processor but is implemented in software rather than hardware.

The mass storage device 1516 may include a machine-readable medium 1522 on which one or more sets of data structures or instructions 1524 (e.g., software) embodying or utilized by any of the techniques or functions described herein. The instructions 1524 may also reside, completely or at least partially, within the main memory 1504, within the static memory 1506, within the hardware processor 1502, or the GPU 1503 during execution thereof by the machine 1500. For example, one or any combination of the hardware processor 1502, the GPU 1503, the main memory 1504, the static memory 1506, or the mass storage device 1516 may constitute machine-readable media.

While the machine-readable medium 1522 is illustrated as a single medium, the term "machine-readable medium" may include a single medium or multiple media (e.g., a centralized or distributed database and associated caches and servers) configured to store one or more instructions 1524.

The term "machine-readable medium" may include any medium that is capable of storing, encoding, or carrying instructions 1524 for execution by the machine 1500 and that causes the machine 1500 to perform any one or more of the techniques of the present disclosure or that is capable of storing, encoding, or carrying data structures used by or associated with such instructions 1524. Non-limiting machine-readable medium examples may include solid-state memories and optical and magnetic media. For example, a massed machine-readable medium comprises a machine-readable medium 1522 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1524 may be transmitted or received over a communications network 1526 using a transmission medium via the network interface device 1520.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented separately. These and other variations, modifications, additions, and improvements fall within the scope of the subject matter herein.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Additionally, as used in this disclosure, phrases of the form "at least one of an A, a B, or a C," "at least one of A, B, and C," and the like should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C" would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in the context of specific illustrative configurations. Other allocations of functionality are envisioned and may fall within the scope of various examples of the present disclosure. In general, structures and functionality are presented as separate resources in the example; configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. Accordingly, the specification and drawings are to be regarded in an illustrative rather than a restrictive sense.

What is claimed is:

1. A computer-implemented method comprising:
   detecting, by a computing device at a vehicle, a threat on the vehicle, the threat comprising signal jamming or tampering with vehicle equipment;
   obtaining a current location of the vehicle;
   determining an immobilization value for immobilization enablement by determining that a data structure includes a node associated with a geographic area that includes the current location of the vehicle;
   immobilizing the vehicle based on the immobilization value;
   detecting that the current location of the vehicle is in a friendly jamming zone; and
   canceling immobilizing the vehicle based on detecting that the current location of the vehicle is in the friendly Jamming zone.

2. The computer-implemented method as recited in claim 1, wherein the immobilization value is enabled for the node associated with a section of a map that covers land and water areas and the node is a leaf node without children nodes.

3. The computer-implemented method as recited in claim 1, wherein a root node of the data structure comprises a horizontal coordinate, a vertical coordinate, a zoom level, and four pointers to children nodes, wherein nodes under the root node comprise the four pointers to children nodes and do not comprise the horizontal coordinate, the vertical coordinate, and the zoom level.

4. The computer-implemented method as recited in claim 1, further comprising:
   generating the data structure at a server; and
   sending the data structure to the computing device at the vehicle.

5. The computer-implemented method as recited in claim 4, wherein generating the data structure comprises:
   analyzing nodes by level starting at a root node; and
   for each node at a given level, splitting the given node if the given node covers a land area where immobilization is allowed and a land area where immobilization is not allowed, and making the given node a leaf node if the given node covers the land area where immobilization is allowed or a water area.

6. The computer-implemented method as recited in claim 1, further comprising:
   identifying a root node as a current node; and
   recursively traversing the data structure to determine the immobilization value.

7. The computer-implemented method as recited in claim 6, wherein recursively checking if the current node has children further comprises:
   determining that the current node has children;
   in response to determining that the current node has children, determining which quadrant of the current node corresponds to the location of the vehicle;
   determining if the node for the quadrant is present or missing;
   in response to determining that the node for the quadrant is missing, setting the immobilization value to disabled and ending the recursive checking; and
   in response to determining that the node for the quadrant is present, making the node for the determined quadrant the current node and continuing the recursive checking.

8. The computer-implemented method as recited in claim 6, wherein recursively checking if the current node has children further comprises:
   determining that the current node has no children; and
   in response to determining that the current node has no children, setting the immobilization value to enabled.

9. The computer-implemented method as recited in claim 1, wherein the threat is signal jamming, wherein immobilizing the vehicle further comprises:
   after a predefined wait time, disabling an accelerator in the vehicle; and
   after disabling the accelerator and detecting that the vehicle has stopped, disabling an ignition of the vehicle.

10. A computer-implemented method comprising:
    detecting, by a computing device at a vehicle, a threat on the vehicle, the threat comprising signal jamming or tampering with vehicle equipment;
    obtaining a current location of the vehicle;
    determining an immobilization value for immobilization enablement by determining that a data structure includes a node associated with a geographic area that includes the current location of the vehicle;
    immobilizing the vehicle based on the immobilization value; and
    providing a user interface (UI) for configuring immobilization based on location, the UI comprising options for the immobilization enablement by location, configuring a map to define where immobilization is enabled, maximum border error, and friendly jamming zones.

11. The computer-implemented method as recited in claim 10, wherein the immobilization value is enabled for the node associated with a section of a map that covers land and water areas and the node is a leaf node without children nodes.

12. The computer-implemented method as recited in claim 10, wherein a root node of the data structure comprises a horizontal coordinate, a vertical coordinate, a zoom level, and four pointers to children nodes, wherein nodes under the root node comprise the four pointers to children nodes and do not comprise the horizontal coordinate, the vertical coordinate, and the zoom level.

13. The computer-implemented method as recited in claim 10, further comprising:
generating the data structure at a server; and
sending the data structure to the computing device at the vehicle.

14. The computer-implemented method as recited in claim 13, wherein generating the data structure comprises:
analyzing nodes by level starting at a root node; and
for each node at a given level, splitting the given node if the given node covers a land area where immobilization is allowed and a land area where immobilization is not allowed, and making the given node a leaf node if the given node covers the land area where immobilization is allowed or a water area.

15. The computer-implemented method as recited in claim 10, further comprising:
identifying a root node as a current node; and
recursively traversing the data structure to determine the immobilization value.

16. The computer-implemented method as recited in claim 15, wherein recursively checking if the current node has children further comprises:
determining that the current node has children;
in response to determining that the current node has children, determining which quadrant of the current node corresponds to the location of the vehicle;
determining if the node for the quadrant is present or missing;
in response to determining that the node for the quadrant is missing, setting the immobilization value to disabled and ending the recursive checking; and
in response to determining that the node for the quadrant is present, making the node for the determined quadrant the current node and continuing the recursive checking.

17. The computer-implemented method as recited in claim 15, wherein recursively checking if the current node has children further comprises:
determining that the current node has no children; and
in response to determining that the current node has no children, setting the immobilization value to enabled.

18. The computer-implemented method as recited in claim 10, wherein the threat is signal jamming, wherein immobilizing the vehicle further comprises:
after a predefined wait time, disabling an accelerator in the vehicle; and
after disabling the accelerator and detecting that the vehicle has stopped, disabling an ignition of the vehicle.

19. A computer-implemented method as comprising:
detecting, by a computing device at a vehicle, a threat on the vehicle, the threat comprising signal jamming or tampering with vehicle equipment;
obtaining a current location of the vehicle;
determining an immobilization value for immobilization enablement by determining that a data structure includes a node associated with a geographic area that includes the current location of the vehicle;
immobilizing the vehicle based on the immobilization value; and
detecting that GPS signal is not adequate to determine the current location of the vehicle; and
utilizing a value of a mobile country code (MCC) to enable immobilization based on the MCC.

20. The computer-implemented method as recited in claim 19, wherein the immobilization value is enabled for the node associated with a section of a map that covers land and water areas and the node is a leaf node without children nodes.

* * * * *

UNITED STATES PATENT AND TRADEMARK OFFICE
CERTIFICATE OF CORRECTION

PATENT NO. : 12,269,425 B1  
APPLICATION NO. : 18/744256  
DATED : April 8, 2025  
INVENTOR(S) : Zhevzhyk et al.

Page 1 of 1

It is certified that error appears in the above-identified patent and that said Letters Patent is hereby corrected as shown below:

On the Title Page

In item (72), in "Inventors", in Column 1, Line 3, delete "Grauman" and insert --Graumann-- therefor In the Specification In Column 8, Line 21, delete "report-generation" and insert --report generation-- therefor In Column 9, Line 33, delete "report-generation" and insert --report generation-- therefor In Column 9, Line 42, delete "report-generation" and insert --report generation-- therefor In Column 21, Line 7, after "vehicle", insert --.--

In the Claims

In Column 25, Line 49, in Claim 1, delete "Jamming" and insert --jamming-- therefor In Column 28, Line 15, in Claim 19, after "method", delete "as"

Signed and Sealed this  
Twenty-first Day of October, 2025

John A. Squires  
*Director of the United States Patent and Trademark Office*